US011803368B2

(12) United States Patent
Agarwal et al.

(10) Patent No.: US 11,803,368 B2
(45) Date of Patent: Oct. 31, 2023

(54) NETWORK LEARNING TO CONTROL DELIVERY OF UPDATES

(71) Applicant: Nutanix, Inc., San Jose, CA (US)

(72) Inventors: Gunjan Agarwal, Bangalore (IN); Kashi Mysore Nagendraprasad, Bangalore (IN); Manish Kumar, Bangalore (IN); Sanjukta Sukul, Bangalore (IN); Shashank Meyar, Bangalore (IN); Shubham Agarwal, Kolkata (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/691,038

(22) Filed: Mar. 9, 2022

(65) Prior Publication Data
US 2023/0103766 A1 Apr. 6, 2023

(30) Foreign Application Priority Data

Oct. 1, 2021 (IN) .............................. 202141044649

(51) Int. Cl.
G06F 8/65 (2018.01)
G06F 8/658 (2018.01)
(Continued)

(52) U.S. Cl.
CPC ................ *G06F 8/658* (2018.02); *G06F 8/61* (2013.01); *G06F 8/71* (2013.01); *G06F 9/4451* (2013.01);
(Continued)

(58) Field of Classification Search
CPC ... G06F 8/658; G06F 8/61; G06F 8/71; G06F 9/4451; G06F 9/45558
(Continued)

(56) References Cited

U.S. PATENT DOCUMENTS 5,594,859 A 1/1997 Palmer et al.
6,064,975 A 5/2000 Moon et al.
(Continued)

FOREIGN PATENT DOCUMENTS

CN 104408071 3/2015
CN 105446828 3/2016
(Continued)

OTHER PUBLICATIONS

Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).

(Continued)

*Primary Examiner* — John Q Chavis
(74) *Attorney, Agent, or Firm* — Foley & Lardner LLP

(57) ABSTRACT

A system and method for updating a customer cluster includes receiving first data from a group of customers intended to receive an update, identifying a subset of customers from the group of customers based on the first data for receiving a canary version of the update, facilitating installation of the canary version of the update on each of the subset of customers, receiving second data from each of the subset of customers upon installation of the canary version of the update, predicting whether the subset of customers that receive the canary version is to increase or decrease based on the second data, and adjusting a number of customers in the subset of customers for receiving the canary version of the update based on the prediction.

33 Claims, 4 Drawing Sheets

(51) Int. Cl.
  *G06F 8/61* (2018.01)
  *G06F 9/445* (2018.01)
  *G06F 9/455* (2018.01)
  *G06F 8/71* (2018.01)

(52) U.S. Cl.
  CPC .............. *G06F 9/45558* (2013.01); *G06F 2009/45595* (2013.01)

(58) Field of Classification Search
  USPC .................................................. 717/168
  See application file for complete search history.

(56) References Cited

U.S. PATENT DOCUMENTS

| | | |
|---|---|---|
| 6,243,715 B1 | 6/2001 | Bogantz et al. |
| D508,248 S | 8/2005 | Ording |
| D521,521 S | 5/2006 | Jewitt et al. |
| 7,225,189 B1 | 5/2007 | McCormack et al. |
| 7,725,671 B2 | 5/2010 | Prahlad et al. |
| D625,315 S | 10/2010 | Jewitt et al. |
| 7,814,057 B2 | 10/2010 | Kathuria et al. |
| 7,840,533 B2 | 11/2010 | Prahlad et al. |
| 7,953,764 B2 | 5/2011 | Baffier et al. |
| 8,117,165 B1 | 2/2012 | Winckelmann et al. |
| D656,948 S | 4/2012 | Kundsen et al. |
| 8,150,808 B2 | 4/2012 | Zha et al. |
| 8,291,409 B2 | 10/2012 | Winner et al. |
| 8,364,648 B1 | 1/2013 | Sim-Tang |
| 8,429,630 B2 | 4/2013 | Nickolov et al. |
| 8,447,728 B2 | 5/2013 | Prahlad et al. |
| D684,160 S | 6/2013 | Truelove et al. |
| D684,161 S | 6/2013 | Truelove et al. |
| 8,468,174 B1 | 6/2013 | Yueh et al. |
| 8,543,916 B2 | 9/2013 | Anderson et al. |
| 8,549,518 B1 | 10/2013 | Aron et al. |
| 8,555,273 B1 | 10/2013 | Chia et al. |
| 8,595,714 B1 | 11/2013 | Hamer |
| 8,601,473 B1 | 12/2013 | Aron et al. |
| 8,612,396 B1 | 12/2013 | McAlister et al. |
| 8,635,421 B2 | 1/2014 | Gupta et al. |
| 8,677,085 B2 | 3/2014 | Vaghani et al. |
| 8,762,335 B2 | 6/2014 | Prahlad et al. |
| 8,832,028 B2 | 9/2014 | Susairaj et al. |
| 8,849,850 B2 | 9/2014 | Baffier et al. |
| 8,850,130 B1 | 9/2014 | Aron et al. |
| 8,863,124 B1 | 10/2014 | Aron |
| 8,874,749 B1 | 10/2014 | Vittal et al. |
| 8,914,567 B2 | 12/2014 | Miroshnichenko et al. |
| 8,972,347 B1 | 3/2015 | Sim-Tang |
| 9,009,106 B1 | 4/2015 | Aron et al. |
| 9,063,818 B1 | 6/2015 | Risbood et al. |
| 9,069,708 B2 | 6/2015 | Gill et al. |
| D733,745 S | 7/2015 | Huang |
| 9,116,737 B2 | 8/2015 | Aswathanarayana et al. |
| 9,244,717 B2 | 1/2016 | Pissay et al. |
| D749,117 S | 2/2016 | Huang |
| 9,256,383 B2 | 2/2016 | De Spiegeleer et al. |
| D753,135 S | 4/2016 | Vazquez |
| D753,140 S | 4/2016 | Kouvas et al. |
| 9,323,641 B2 | 4/2016 | Beasley |
| 9,336,060 B2 | 5/2016 | Nori et al. |
| 9,336,132 B1 | 5/2016 | Aron et al. |
| 9,372,758 B2 | 6/2016 | Ashutosh et al. |
| D761,288 S | 7/2016 | Cianflone et al. |
| 9,389,962 B1 | 7/2016 | Yueh et al. |
| D763,890 S | 8/2016 | Pan |
| 9,413,810 B2 | 8/2016 | Rezvani et al. |
| 9,436,556 B2 | 9/2016 | Siden et al. |
| D771,102 S | 11/2016 | Protzman et al. |
| 9,495,435 B2 | 11/2016 | Zhang et al. |
| 9,507,579 B2 | 11/2016 | Gambardella et al. |
| 9,529,551 B2 | 12/2016 | Kesavan et al. |
| D777,747 S | 1/2017 | Derby et al. |
| D778,296 S | 2/2017 | Belkin et al. |
| D779,514 S | 2/2017 | Baris et al. |
| D781,887 S | 3/2017 | Dziuba et al. |
| 9,600,193 B2 | 3/2017 | Ahrens et al. |
| 9,639,429 B2 | 5/2017 | Stewart et al. |
| 9,652,265 B1 | 5/2017 | Narayanasamy et al. |
| D794,666 S | 8/2017 | Havaldar et al. |
| D794,667 S | 8/2017 | Havaldar et al. |
| 9,740,723 B2 | 8/2017 | Prahlad et al. |
| 9,747,287 B1 | 8/2017 | Bhardwaj et al. |
| D797,116 S | 9/2017 | Chapman et al. |
| 9,753,713 B2 | 9/2017 | Mani et al. |
| 9,760,396 B2 | 9/2017 | Apte et al. |
| 9,772,866 B1 | 9/2017 | Aron et al. |
| 9,778,992 B1 | 10/2017 | Yueh et al. |
| D802,608 S | 11/2017 | Hicks et al. |
| D803,231 S | 11/2017 | Guinness et al. |
| D807,902 S | 1/2018 | Cong et al. |
| 9,858,155 B2 | 1/2018 | Ashutosh et al. |
| 9,881,168 B2 | 1/2018 | Chari et al. |
| D809,530 S | 2/2018 | Matheson et al. |
| D815,652 S | 4/2018 | Protzman et al. |
| D817,976 S | 5/2018 | Shilwant et al. |
| 9,960,963 B2 | 5/2018 | Selvaraj et al. |
| 10,013,313 B2 | 7/2018 | Zhang et al. |
| 10,033,833 B2 | 7/2018 | Fu et al. |
| 10,055,300 B2 | 8/2018 | Zhang et al. |
| 10,108,685 B2 | 10/2018 | Amdur et al. |
| D838,288 S | 1/2019 | Sunshine et al. |
| 10,185,627 B2 | 1/2019 | Wong et al. |
| D839,913 S | 2/2019 | Chen et al. |
| 10,210,048 B2 | 2/2019 | Sancheti |
| 10,212,195 B2 | 2/2019 | Maskalik et al. |
| D843,388 S | 3/2019 | Protzman et al. |
| 10,248,657 B2 | 4/2019 | Prahlad et al. |
| 10,282,201 B2 | 5/2019 | Tekade et al. |
| 10,339,110 B2 | 7/2019 | Marinov et al. |
| 10,346,431 B1 | 7/2019 | Broda et al. |
| 10,372,329 B1 | 8/2019 | Ahrens et al. |
| 10,379,963 B2 | 8/2019 | Bhargava et al. |
| 10,416,986 B2 | 9/2019 | Mukhopadhyay et al. |
| D862,512 S | 10/2019 | Schubart |
| 10,445,298 B2 | 10/2019 | Ramu et al. |
| 10,447,806 B2 | 10/2019 | Sahay et al. |
| 10,476,955 B2 | 11/2019 | Mutalik et al. |
| D870,762 S | 12/2019 | Mendoza Corominas et al. |
| 10,503,612 B1 | 12/2019 | Wang et al. |
| 10,509,798 B2 | 12/2019 | Chow et al. |
| D875,108 S | 2/2020 | Chitalia et al. |
| D877,753 S | 3/2020 | Chitalia et al. |
| 10,599,423 B2 | 3/2020 | Coleman et al. |
| 10,613,938 B2 | 4/2020 | Blumenau et al. |
| 10,637,914 B2 | 4/2020 | Basavaiah et al. |
| 10,642,603 B2 | 5/2020 | Olderdissen et al. |
| 10,700,991 B2 | 6/2020 | Khinvasara et al. |
| 10,725,866 B1 | 7/2020 | Palaiah et al. |
| 10,728,255 B2 | 7/2020 | Jindal et al. |
| 10,757,036 B2 | 8/2020 | Tung et al. |
| 10,776,329 B2 | 9/2020 | Ramohalli Gopala Rao et al. |
| 10,785,029 B2 | 9/2020 | Gupta et al. |
| 10,812,582 B2 | 10/2020 | Spillane et al. |
| 10,817,157 B2 | 10/2020 | Kuchibhotla et al. |
| 10,838,776 B2 | 11/2020 | Mahajan et al. |
| D911,356 S | 2/2021 | Varghese et al. |
| 10,959,098 B2 | 3/2021 | Cidon et al. |
| 10,999,165 B2 | 5/2021 | Cidon et al. |
| 11,010,336 B2 | 5/2021 | Kuchibhotla et al. |
| 11,010,487 B2 | 5/2021 | Noe et al. |
| D926,200 S | 7/2021 | Murphy et al. |
| D927,507 S | 8/2021 | Norman |
| 11,126,426 B2 | 9/2021 | Zhu et al. |
| 11,243,755 B1 | 2/2022 | Lanner et al. |
| D947,216 S | 3/2022 | Leininger |
| D947,239 S | 3/2022 | Rubin et al. |
| D947,240 S | 3/2022 | Rubin et al. |
| 2001/0014867 A1 | 8/2001 | Conmy |
| 2002/0073089 A1 | 6/2002 | Schwartz et al. |
| 2002/0104376 A1 | 8/2002 | Danyluk et al. |
| 2002/0174098 A1 | 11/2002 | Wu et al. |
| 2003/0147309 A1 | 8/2003 | Weisberg |

(56) References Cited

U.S. PATENT DOCUMENTS

| | | |
|---|---|---|
| 2004/0107417 A1 | 6/2004 | Chia et al. |
| 2005/0149757 A1 | 7/2005 | Corbett et al. |
| 2006/0143600 A1 | 6/2006 | Cottrell et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2008/0126945 A1 | 5/2008 | Munkvold et al. |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0125858 A1 | 5/2009 | Vishweshwara et al. |
| 2009/0132543 A1 | 5/2009 | Chatley et al. |
| 2009/0320013 A1 | 12/2009 | Maeda |
| 2011/0004586 A1 | 1/2011 | Cherryholmes et al. |
| 2011/0071981 A1 | 3/2011 | Ghosh et al. |
| 2011/0093435 A1 | 4/2011 | Zha et al. |
| 2012/0011378 A1 | 1/2012 | Dalton et al. |
| 2012/0123999 A1 | 5/2012 | Ashutosh et al. |
| 2012/0271797 A1 | 10/2012 | Patil |
| 2013/0074061 A1 | 3/2013 | Averbuch et al. |
| 2013/0117441 A1 | 5/2013 | Kuchibhotla et al. |
| 2013/0290180 A1 | 10/2013 | Baffier et al. |
| 2014/0122825 A1 | 5/2014 | Kono et al. |
| 2014/0189685 A1 | 7/2014 | Kripalani |
| 2014/0229698 A1 | 8/2014 | Sivasubramanian et al. |
| 2014/0282256 A1 | 9/2014 | Fish et al. |
| 2015/0019495 A1 | 1/2015 | Siden et al. |
| 2015/0052108 A1 | 2/2015 | Volk et al. |
| 2015/0121453 A1 | 4/2015 | Gupta |
| 2015/0142610 A1 | 5/2015 | Manoharan et al. |
| 2015/0143064 A1 | 5/2015 | Bhargava et al. |
| 2015/0195347 A1 | 7/2015 | Luft |
| 2015/0212808 A1 | 7/2015 | Mandava |
| 2015/0227435 A1 | 8/2015 | Ashutosh et al. |
| 2015/0227602 A1 | 8/2015 | Ramu et al. |
| 2015/0331923 A1 | 11/2015 | Kim |
| 2015/0347987 A1 | 12/2015 | Ali |
| 2015/0365437 A1 | 12/2015 | Bell et al. |
| 2016/0041997 A1 | 2/2016 | Gokhale et al. |
| 2016/0048408 A1 | 2/2016 | Madhu et al. |
| 2016/0057014 A1 | 2/2016 | Thakkar et al. |
| 2016/0077923 A1 | 3/2016 | Zhang et al. |
| 2016/0078104 A1 | 3/2016 | Clifford et al. |
| 2016/0119207 A1* | 4/2016 | Tseitlin ............... H04L 41/5096 709/224 |
| 2016/0125059 A1 | 5/2016 | Jain et al. |
| 2016/0162845 A1 | 6/2016 | Carroll et al. |
| 2016/0197835 A1 | 7/2016 | Luft |
| 2016/0267105 A1 | 9/2016 | Sun et al. |
| 2016/0274981 A1 | 9/2016 | Wilkinson |
| 2016/0292358 A1 | 10/2016 | Heger |
| 2016/0321339 A1 | 11/2016 | Tekade et al. |
| 2016/0335369 A1 | 11/2016 | Picard et al. |
| 2016/0350671 A1 | 12/2016 | Morris et al. |
| 2016/0371105 A1 | 12/2016 | Sieffert et al. |
| 2016/0380809 A1 | 12/2016 | Hou et al. |
| 2017/0060699 A1 | 3/2017 | Hohl et al. |
| 2017/0115978 A1 | 4/2017 | Modi et al. |
| 2017/0220777 A1 | 8/2017 | Wang et al. |
| 2017/0264684 A1 | 9/2017 | Spillane et al. |
| 2017/0286518 A1 | 10/2017 | Horowitz et al. |
| 2017/0322815 A1 | 11/2017 | Buswell |
| 2017/0351584 A1 | 12/2017 | Griffith et al. |
| 2017/0351716 A1 | 12/2017 | Higginson et al. |
| 2018/0025007 A1 | 1/2018 | Dai |
| 2018/0121494 A1 | 5/2018 | Antonopoulos et al. |
| 2018/0181469 A1 | 6/2018 | Yueh et al. |
| 2018/0253676 A1 | 9/2018 | Sheth et al. |
| 2018/0285201 A1 | 10/2018 | Bangalore et al. |
| 2018/0307728 A1 | 10/2018 | Crupi et al. |
| 2019/0018738 A1 | 1/2019 | Chen |
| 2019/0026140 A1 | 1/2019 | Mahajan et al. |
| 2019/0026141 A1 | 1/2019 | Mahajan et al. |
| 2019/0026321 A1 | 1/2019 | Mukhopadhyay et al. |
| 2019/0065322 A1 | 2/2019 | Chakankar et al. |
| 2019/0075031 A1 | 3/2019 | Skelton et al. |
| 2019/0102257 A1 | 4/2019 | Zhou et al. |
| 2019/0102411 A1 | 4/2019 | Hung et al. |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0220271 A1 | 7/2019 | Olderdissen et al. |
| 2019/0230156 A1 | 7/2019 | McLarty et al. |
| 2019/0235904 A1 | 8/2019 | Epping et al. |
| 2019/0294463 A1 | 9/2019 | Mukhopadhyay et al. |
| 2019/0312800 A1* | 10/2019 | Schibler .................. G06F 8/65 |
| 2019/0324865 A1 | 10/2019 | Weissman et al. |
| 2019/0339870 A1 | 11/2019 | Meiri et al. |
| 2019/0340091 A1 | 11/2019 | Chandrasekaran et al. |
| 2019/0342375 A1 | 11/2019 | Stefanov et al. |
| 2019/0384496 A1 | 12/2019 | Abdul Rasheed et al. |
| 2019/0391880 A1 | 12/2019 | Wang et al. |
| 2020/0034178 A1 | 1/2020 | Gupta et al. |
| 2020/0034245 A1 | 1/2020 | Kohler |
| 2020/0050522 A1 | 2/2020 | Coleman et al. |
| 2020/0073648 A1 | 3/2020 | Ambre et al. |
| 2020/0097279 A1 | 3/2020 | Mukhopadhyay et al. |
| 2020/0099692 A1 | 3/2020 | Jindal et al. |
| 2020/0104375 A1 | 4/2020 | Earnesty et al. |
| 2020/0104376 A1 | 4/2020 | Earnesty et al. |
| 2020/0104377 A1 | 4/2020 | Earnesty et al. |
| 2020/0106737 A1 | 4/2020 | Beedu et al. |
| 2020/0110675 A1 | 4/2020 | Wang et al. |
| 2020/0137157 A1 | 4/2020 | Joseph et al. |
| 2020/0193388 A1 | 6/2020 | Tran-Kiem et al. |
| 2020/0201526 A1 | 6/2020 | Kuchibhotla et al. |
| 2020/0201664 A1 | 6/2020 | Panse et al. |
| 2020/0201665 A1 | 6/2020 | Panse et al. |
| 2020/0210378 A1 | 7/2020 | Kuchibhotla et al. |
| 2020/0210379 A1 | 7/2020 | Kuchibhotla et al. |
| 2020/0228547 A1 | 7/2020 | Kottapalli et al. |
| 2020/0250046 A1 | 8/2020 | Wong et al. |
| 2020/0285608 A1 | 9/2020 | Chakankar et al. |
| 2020/0285652 A1 | 9/2020 | Wang et al. |
| 2020/0342107 A1 | 10/2020 | Soryal |
| 2020/0349018 A1 | 11/2020 | Meadowcroft et al. |
| 2020/0379793 A1 | 12/2020 | Parihar et al. |
| 2021/0004000 A1 | 1/2021 | Kalaskar et al. |
| 2021/0117293 A1 | 4/2021 | Luo et al. |
| 2021/0133031 A1 | 5/2021 | Moldvai et al. |
| 2021/0182047 A1 | 6/2021 | O'Dell et al. |

FOREIGN PATENT DOCUMENTS

| | | |
|---|---|---|
| CN | 108664660 | 10/2018 |
| CN | 108874415 A | 11/2018 |
| CN | 113010599 | 6/2021 |
| EP | 1 654 683 | 5/2006 |
| EP | 3 317 762 | 5/2018 |
| TW | 201600970 A1 | 1/2016 |
| WO | WO-2016/069029 | 5/2016 |
| WO | WO-2017/004269 | 1/2017 |
| WO | WO-2020/072338 | 4/2020 |

OTHER PUBLICATIONS

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

(56) References Cited

OTHER PUBLICATIONS

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

Aws, "Working with Aurora multi-master clusters" User Guide for Aurora. 2020. (Year: 2020).

Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).

Balasubramanian, Sudhir, "Virtual Volume for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).

Brull, Jim, "Oracle Cloud Database vs On-Premises—Understanding the Differences" Centroid—OCI, Oracle Cloud. 2020. (Year: 2020).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Cano, Ignacio, et al. "Curator: Self-Managing Storage for Enterprise Clusters" (Mar. 27, 2017), from https://www.usenix.org/conference/nsdi17/.

Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).

Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).

Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).

Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).

Delphix "Database Provisioning Overview" (published 2017) Delphix Corp., from https://docs.delphix.com/docs/introduction/database-virtualization-with-delphix/database-provisioning-overview (accessed Dec. 19, 2019).

Delphix "Quick Start Guides" (published 2017) Delphix Corp., from https://docs.delphix.com/docs52/quick-start-guides (accessed Dec. 19, 2019).

Delphix "Replication" (Published 2017) Delphix Corp., from https://docs.delphix.com/docs52/data-backup-and-recovery-solutions/replication (accessed Dec. 19, 2019).

Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).

Delphix, "Understanding SnapSync and LogSync for Oracle" (May 5, 2013) from https://www.delphix.com/blog/data-virtualization/understanding-snapsync-and-logsync-oracle (accessed Jan. 7, 2020).

Drake, Sam et al. "Architecture of Highly Available Databases" International Service Availability Symposium, pp. 1-16. Springer, Berlin, Heidelberg, 2004. (Year: 2004).

Dremio, "Multiple AWS Clusters" Dremio. 2020. (Year: 2020).

Extended European Search Report re EP21192308.1 dated Jan. 24, 2022.

Extended European Search Report re EP21192379.2 dated Jan. 26, 2022.

Fenton, Tom, "How To Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).

Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).

Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017/07/designing-perfect-date-time-picker/> (Year: 2017).

Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).

Geier, Eric, "Using Static IP Addresses on Your Network" Cisco Press. Sep. 14, 2009. (Year: 2009).

Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).

Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).

Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).

Hammerspace, "Simplify Database Deployment Across Kubernetes Clusters" Hammerspace Solution Brief. 2020. (Year: 2020).

Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).

Hosterman, Cody, "Introducing vSphere Virtual vols. on the FlashArray" PureStorage, (Jun. 13, 2017) from https://blog.purestorage.com/purely-technical/introducing-vsphere-virtual-volumes-on-the-flasharray/ (accessed Jun. 28, 2021).

Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).

Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).

Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).

IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).

Katz, Jonathan S. "Multi-Kubernetes Cluster PostgreSQL Deployments" Crunchy Data. May, 7, 2020. (Year: 2020).

(56) References Cited

OTHER PUBLICATIONS

Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).

Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).

Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).

Kubernetes, "Configure Access to Multiple Clusters" Kubernetes Documentation. Oct. 22, 2020. (Year: 2020).

Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).

Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).

M. A. Metawai et al. "Load balancing in distributed multi-agent computing systems" Ain Shams Engineering Journal. ASEJ. May 23, 2012. p. 237-249. (Year: 2012).

Matijaca, Ante, "Dashboard" Dribble, published Dec. 21, 2015, retrieved Feb. 11, 2022 from <https://dribbble.com/shots/2417233-Dashboard> (Year: 2015).

Meadowcroft, Ben, "Virtual Volumes: First Year In Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).

Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).

Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).

Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).

Microsoft Docs, "Always On availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.

Microsoft Docs, "What is an Always On availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.

Microsoft SQL, "Upgrading Always On Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).

Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).

Net App Support, "Data replication from one destination to another in a series (cascading)" Net App. 2015. (Year: 2015).

Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).

Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).

Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).

Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).

Nutanix, "Nutanix Hybrid Cloud Infrastructure Now Available on Amazon Web Services" Nutanix Press Release. Aug. 11, 2020. (Year: 2020).

Nyffenegger et al., "SQL Server Instance" 2017, from https://renenyffenegger.ch/notes/development/databases/SQL-Server/architecture/instance (retrieved Jan. 25, 2022).

Opster, "High Availability in Elasticsearch—Cross Cluster Replication and Alternatives" Opster. 2020. (Year: 2020).

Opster, "Multi-Cluster Load Balancer-An Alternative to Cross Cluster Replication" Opster. 2020. (Year: 2020).

Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).

Oracle Communications, "Provisioning Database Interface User's Guide, Release 16.0" (Sep. 2014) Oracle, p. 1-174.

Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).

Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).

Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).

Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).

Patil, Manoj E. et al. "Design and Implementation of Graphical User Interface for Relational Database Management System" (2012), International Jounral of Computer Science and Information Technologies (IJCSIT), vol. 3 (3), p. 3871-3874.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).

Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).

(56) References Cited

OTHER PUBLICATIONS

Reed, Kate "Nutanix Introduces Database Services with Era" (published May 9, 2018) Business Wire, from https://www.businesswire.com/news/home/20180509005397/en/ (accessed Dec. 18, 2019).
Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).
Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).
Sanglaji, Maryam et al. "Nutanix Era: Databases Made Simple" (published 2018) Nutanix, from https://www.nutanix.com/blog/nutanix-era-databases-made-simple (accessed Dec. 18, 2019).
Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).
Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).
Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).
Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).
Stepan, "How to Set Up Multi-Cluster Load Balancing with GKE", DoiT International. Aug. 17, 2020. (Year: 2020).
Storti, Brian "A Primer on Database Replication" Brianstorti.com (May 23, 2017) from https://www.brianstorti.com/replication/ (accessed Jun. 28, 2021).
Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
Virtualization Works, "VMware vFabric Data Director" Virtualization Works: VMware Authorized Online Reseller, (Jun. 2021) from https://www.virtualizationworks.com/vFabric-Data-Director.asp#:~: text=VMware%C2%AE%20vFabric%E2%84%A2%20Data,agility%20and%20reducing%20database%20TCO (accessed Jun. 28, 2021).
VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).
VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).
VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).
VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).
VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).
VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).
VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).
VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).
VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).
Warner, Alex et al., "Chapter 16—Canarying Releases" (published 2018) Google Workbook published by O'Reilly Media, Inc., from https://sre.google/workbook/canarying-releases/ (accessed Sep. 14, 2021).
Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).
WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).
Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).
YouTube Video screenshots for "Bala Kuchibhotla, Nutanix | Nutanix .NEXT EU 2019," YouTube, Oct. 10, 2019, https://www.youtube.com/watch?v=_0Ma-2o92Y0 [youtube.com].
YouTube Video screenshots for "Nutanix Business Critical Applications & Databases—.NEXT Europe 2019," YouTube, Oct. 16, 2019, https://www.youtube.com/watch?v=KI7IEmm6j6o [youtube.com].
YouTube Video screenshots for "Nutanix Era .NEXT 2019 Demo," YouTube, May 10, 2019, https://www.youtube.com/watch?v=PAWHHdCEArc&t=267s [youtube.com].
YouTube Video screenshots for Nutanix , "Nutanix Era .NEXT 2019 Demo", YouTube, May 10, 2019, https://youtu.be/PAWHHdCEArc [youtube.com].
YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].
Infor "LifeCycle Manager" (2020) M3 Core 13.4 Installation Guides IBM i, from https://docs.infor.com/help_m3_coreit_13.4/index.jsp?topic=%2Fcom.lawson.help.installa%2Fcom.infor.help.m3coreipg_ibmi_13.4.0%2Fxdv1493403335110.html.

(56) References Cited

OTHER PUBLICATIONS

Jubran, "Life Cycle Management (LCM)" (Apr. 2020) Nutanix NEXT Community Edition, from https://next.nutanix.com/how-it-works-22/life-cycle-management-lcm-37352.

Nutanix "AOS 5.0 New Feature: Life Cycle Management" (Jul. 2017) Nutanix NEXT Community Edition, from https://next.nutanix.com/blog-40/aos-5-0-new-feature-life-cycle-management-17322.

Nutanix "LCM Series | List of pre-checks before the upgrade" (Dec. 2019) Nutanix NEXT Community Edition, from https://next.nutanix.com/prism-infrastructure-management-26/lcm-series-list-of-pre-checks-before-the-upgrade-33730.

Nutanix, "Cloud Infrastructure Software and Firmware Upgrades" 2020, Nutanix, https://www.nutanix.com/products/life-cycle-manager.

Nutanix, "Nutanix Lifecycle Management (LCM)" 2020, Nutanix, https://www.nutanix.com/content/dam/nutanix/resources/datasheets/ds-lcm.pdf.

Scikit Learn, "sklearn.neural_network.MLPClassifier" 2017, scikit-learn developers, https://scikit-learn.org/stable/modules/generated/sklearn.neural_network.MLPClassifier.html.

VMware Docs "About vSphere Lifecycle Manager" (May 8, 2020) VMware vSphere Docs, from https://docs.vmware.com/en/VMware-vSphere/7.0/com.vmware.vsphere-lifecycle-manager.doc/GUID-74295A37-E8BB-4EB9-BFBA-47B78F0C570D.html.

VMware Inc. "VMware vRealize Suite Lifecycle Manager" (2020) VMWare Datasheet, from https://www.vmware.com/content/dam/digitalmarketing/vmware/en/pdf/products/vmware-vRealize-Suit-Lifecycle-Manager-8.0-Datasheet.pdf.

Non-Final Office Action on U.S. Appl. No. 17/461,137 dated Dec. 19, 2022.

Bigler, Rene. "Nutanix Life Cycle Management (LCM)" dready's Blog. May 5, 2018. Retrieved from https://dreadysblog.com/2018/05/05/nutanix-life-cycle-management-lcm/ (accessed Feb. 13, 2023).

Final Office Action on U.S. Appl. No. 17/461,137 dated Apr. 5, 2023.

Nutanix. "Life Cycle Manager Guide v 2.1" Published Nov. 14, 2019. Retrieved Feb. 13, 2023.

Nutanix. "Life Cycle Manager Guide v 2.3" Published Jun. 12, 2020. Retrieved Feb. 14, 2023.

Nutanix. "Life Cycle Manager Guide v 2.4" Support and Insights. Nov. 15, 2022. Retrieved from https://portal.nutanix.com/page/documents/details?targetId=Life-Cycle-Manager-Guide-v2_4:Life-Cycle-Manager-Guide-v2_4 (accessed Feb. 13, 2023).

\* cited by examiner

NETWORK LEARNING TO CONTROL DELIVERY OF UPDATES

CROSS-REFERENCE TO RELATED APPLICATIONS

This is a US non-provisional application that claims priority from IN Provisional Application No. 202141044649, filed on Oct. 1, 2021, the entirety of which is incorporated by reference herein.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

In accordance with some aspects of the present disclosure, a method is disclosed. The method includes receiving, by a processor in a virtual computing system, first data from a group of customers intended to receive an update, identifying, by the processor, a subset of customers from the group of customers based on the first data for receiving a canary version of the update, facilitating installation, by the processor, of the canary version of the update on each of the subset of customers, receiving, by the processor, second data from each of the subset of customers upon installation of the canary version of the update, predicting, by the processor, whether the subset of customers that receive the canary version is to increase or decrease based on the second data, and adjusting, by the processor, a number of customers in the subset of customers for receiving the canary version of the update based on the prediction.

In accordance with some other aspects of the present disclosure, a non-transitory computer-readable media having computer-readable instructions stored thereon is disclosed. The computer-readable instructions when executed by a processor associated with a virtual computing system cause the processor to perform a process including receiving first data from a group of customers intended to receive an update, identifying a subset of customers from the group of customers based on the first data for receiving a canary version of the update, facilitating installation of the canary version of the update on each of the subset of customers, receiving second data from each of the subset of customers upon installation of the canary version of the update, predicting whether the subset of customers that receive the canary version is to increase or decrease based on the second data, and adjusting a number of customers in the subset of customers for receiving the canary version of the update based on the prediction.

In accordance with yet other aspects of the present disclosure, a system is disclosed. The system includes a memory storing computer-readable instructions thereon and a processor that executes the computer-readable instructions to receive first data from a group of customers intended to receive an update, identify a subset of customers from the group of customers based on the first data for receiving a canary version of the update, facilitate installation of the canary version of the update on each of the subset of customers, receive second data from each of the subset of customers upon installation of the canary version of the update, predict whether the subset of customers that receive the canary version is to increase or decrease based on the second data, and adjust a number of customers in the subset of customers for receiving the canary version of the update based on the prediction.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
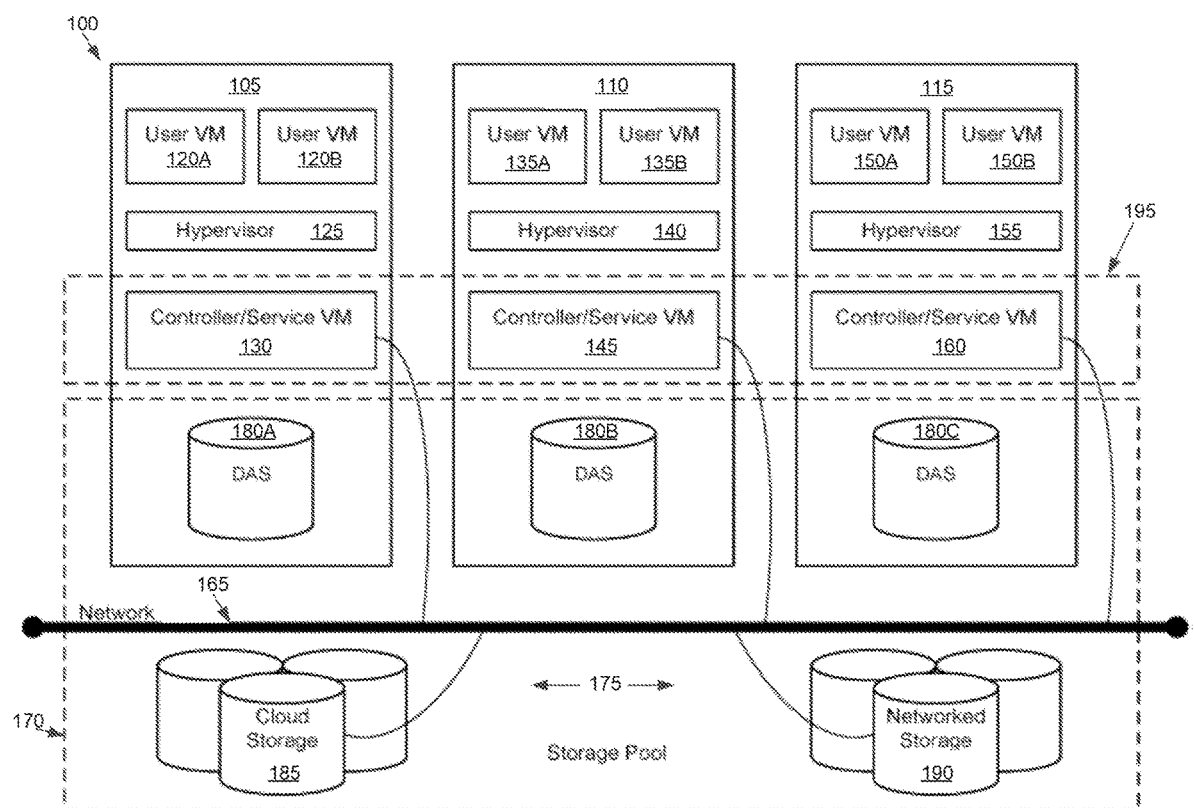
FIG. 1 is an example block diagram of a cluster in a hyperconverged virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to performing updates of a component (e.g., cluster) in a hyperconverged virtual computing system having a plurality of clusters, with each cluster having one or more host machines or nodes. Each node may include one or more virtual machines, with each virtual machine being managed, controlled, and otherwise operated by an instance of a virtual machine monitor (e.g., hypervisor) and a controller/service virtual machine (CVM). Proper operation of the various components (e.g., host machines, virtual machines, network devices, storage devices, etc., also collectively referred to herein as "entities") of the virtual computing system may require periodically upgrading those components to provide new features, security fixes, enhance user experience, etc. Updates to a component may involve software updates, hardware updates, and/or firmware updates. For example, updates may include operating system updates, virtual machine monitor upgrades, or upgrades to other software associated with the various components of the virtual computing system. The terms "update" and "upgrade" are used interchangeably herein.

To perform an upgrade on a component, in some embodiments, that component may be placed in a maintenance mode and booted into a specific update "environment" or "state." The upgrade may be performed in that update environment, and upon finishing the upgrade, the component may be booted out of that update environment and removed from maintenance mode. An "update environment" or "update state" may include various libraries, scripts, binaries, and/or other types of data, including an ISO file image, that may enable updating a component. Example update environments or states may include Phoenix, IVU (In Virtual Machine Updates), etc. Thus, a component of the virtual computing system may be running in a Phoenix environment, an IVU environment, etc. during updates. In some embodiments, to perform an upgrade, a Life Cycle Manager (LCM) may be used. LCM may allow for lifecycle management of firmware and software entities within a virtual computing system (e.g., a distributed datacenter) without disruption by intelligently managing upgrades through comprehensive dependency management and one-click simplicity.

In some embodiments, the LCM may perform updates in one or more phases. For example, in a first phase, the LCM may perform steps to prepare the environment before the actual upgrade. For example, before the upgrade to a new version the LCM may check for compatibility of a component to ensure that the component is able to upgrade from the existing version and remain operational after the upgrade. The LCM may also check for network connectivity, amount of space needed for the update, amount of space available on the cluster, etc.

Upon completing the first phase, the LCM may install the upgrade to the component. In some embodiments, the upgrade may be applied to one node at a time to ensure continuity of operation such that the other nodes continue to operate while one node is being upgraded. The node being upgraded may be allocated an upgrade token. Before the upgrade, virtual machines from the node holding the upgrade token may be migrated out and any input/output requests to the migrated virtual machines may be forwarded to the nodes to which the virtual machines are migrated to. Any virtual machines that are unable to migrate out may be shut down. Upon migrating the virtual machines or shutting down the virtual machines, the node may be upgraded. In some embodiments, the node may be rebooted into a desired upgrade environment (e.g., Phoenix) before the update. When the upgrade is complete, the node is rebooted to implement the update and to move out of the update environment and into the operating environment. The virtual machines may then be migrated back to the node and the virtual machines that were shut down may be restarted to complete the update. When the update is complete, the upgrade token may be released and allocated to a next node that needs to be updated. Thus, an LCM upgrade may include the following stages: (1) checking for system conditions that may fail the upgrade (pre-check), (2) downloading of artifacts needed for the upgrade, (3) performing the upgrade operation (this stage may itself include multiple stages), and (4) running compatibility checks after a successful upgrade.

In some embodiments, the above process of updating a component may be considered time consuming. For example, in some embodiments, the total time for upgrading each node may be around 20-50 minutes. Further, the above process may require migrating out virtual machines or shutting down virtual machines, and rebooting the node, which may all disrupt operations and cause inconvenience to a user. In some embodiments, updates in the IVU environment (e.g., IVU updates) may be more desirable. Updates in the IVU environment may avoid the need for migrating or shutting down the virtual machines, as well as possibly avoid the need for rebooting the node upon completing the update. IVU updates may be particularly beneficial for firmware updates (e.g., disk upgrades) or any component that is "passed through" to the CVM. A component may be "passed through" to the CVM if that component is owned by or otherwise managed by the CVM. IVU updates may be performed in the CVM itself, as opposed to the node. In some embodiments, a reboot of the CVM may be needed to implement the update. However, a reboot of the node may still be avoided. IVU updates may be much faster than Phoenix updates. For example, in some embodiments, an IVU update may take a total time (e.g., of all the nodes included) of about 10-30 minutes, with about 1-2 minutes for rebooting to and out of IVU. In other embodiments, other types of update environments or update states may be used.

Thus, in some embodiments, customers may receive updates via the LCM. In other embodiments, updates may be uploaded to a secure portal (e.g., an authenticated drive) from where the customers may download the update for installation. Regardless of whether customers receive their updates through LCM, portals, or any other mechanisms, in some cases, the updates may prove detrimental. For example, in some embodiments, an update may be incompatible with existing software, firmware, and/or hardware associated with a component on which the update is installed. This incompatibility may result in the update not being installed properly, thereby leaving the component vulnerable and/or negatively impact the operation of the component. In many cases, this incompatibility may not be apparent until after the update has been performed, requiring a user to uninstall the update, incurring additional time, cost, and inconvenience. Further, in some embodiments, a particular update that is well accepted by a particular component of one customer may prove harmful for the same component at another customer. Thus, in some embodiments, an update may behave differently with different customers.

In some embodiments, a group of customers may be selected for an initial release of an update. This group of customers may be selected based on a static criterion such as location, demographics, etc. In some cases, a random group of users may be selected for the initial release of the update. This group of users selected based on a static criterion or selected randomly may not be the most suitable group of users to receive the initial release of the update. Thus, randomly selecting customers or selecting customers based on a static criterion may not be desirable.

Instead of retroactively determining whether a particular update is suitable for a particular customer, the present disclosure provides a mechanism to proactively identify suitability of updates for specific customers using machine learning. Specifically, the present disclosure uses network learning to learn about the customers that are to receive a particular update. Network learning may involve collecting data from the customers and analyzing that data using machine learning to identify one or more customers who are suitable to receive an update. Thus, in some embodiments, a subset of customers, referred to herein as canary customers, receive the update initially. Data, referred to herein as pulse data, is collected from the canary customers. The collected data is analyzed using machine learning to determine if the update is suitable to expand to additional customers or if there is a potential problem with the update that needs to be resolved before sending the update to additional customers. The canary customers may be selected from a pool of customers who are considered suitable for receiving the update initially. The canary customers may be those customers who are considered most suitable for receiving an initial release of an update. The canary customers may be selected based on machine learning by analyzing a wide variety of data. In some embodiments, each customer may be independently analyzed to determine that customer's suitability for being a canary customer. Thus, choosing customers for the initial release of an update is not based on any random or static criteria. Rather, the selection is based on a strategic determination tailored towards each particular customer.

Thus, the release of an update occurs in a controlled fashion based on networking learning. Only target customers (e.g., canary customers) who are deemed suitable to receive the update receive the update initially, thereby reducing the risk of impacting multiple users negatively and increasing customer experience. The controlled release of updates provides technical solutions that improve the release of new updates based on adaptive and dynamic analyses of customer health using machine learning. The canary release of updates may be used for both cloud-based customer clusters and on-premise based customer clusters.

Referring now to FIG. 1, a hyperconverged cluster 100 of a virtual computing system is shown, in accordance with some embodiments of the present disclosure. The cluster 100 may be hosted on-premise or may be located on a cloud. The cluster 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service virtual machine (CVM) 130 configured to manage, route, and otherwise handle workflow requests between the various nodes of the cluster 100. Similarly, the second node 110 includes user VMs 135A and 135B (collectively referred to herein as "user VMs 135"), a hypervisor 140, and a CVM 145, and the third node 115 includes user VMs 150A and 150B (collectively referred to herein as "user VMs 150"), a hypervisor 155, and a CVM 160. The CVM 130, the CVM 145, and the CVM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The cluster 100 also includes and/or is associated with a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In some embodiments, one or more of the first node 105, the second node 110, and the third node 115 may include bare metal instances (e.g., Amazon Web Services bare metal instances) in cloud. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the CVM 130, the CVM 145, and the CVM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the CVM 130, the CVM 145, the CVM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. For example, each of the hypervisor 125, the hypervisor 140, and the hypervisor 155 may allocate memory and other resources to the underlying user VMs (e.g., the user VMs 120, the user VMs 135, and the user VMs 150) from the storage pool 170 to perform one or more functions.

By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new user VMs are created (e.g., installed) on the first node 105, the second node 110, and the third node 115, each of the new user VMs may be configured to be associated with certain hardware resources, software resources, storage resources, and other resources within the cluster 100 to allow those virtual VMs to operate as intended.

The user VMs 120, the user VMs 135, the user VMs 150, and any newly created instances of the user VMs are controlled and managed by their respective instance of the CVM 130, the CVM 145, and the CVM 160. The CVM 130, the CVM 145, and the CVM 160 are configured to communicate with each other via the network 165 to form a distributed system 195. Each of the CVM 130, the CVM 145, and the CVM 160 may be considered a local management system configured to manage various tasks and operations within the cluster 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the CVM 130, the CVM 145, the CVM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the cluster 100. For example, a particular user VM (e.g., the user VMs 120, the user VMs 135, or the user VMs 150) may direct an input/output request to the CVM (e.g., the CVM 130, the CVM 145, or the CVM 160, respectively) on the underlying node (e.g., the first node 105, the second node 110, or the third node 115, respectively). Upon receiving the input/output request, that CVM may direct the input/output request to the CVM (e.g., one of the CVM 130, the CVM 145, or the CVM 160) of the leader node. In some cases, the CVM that receives the input/output request may itself be on the leader node, in which case, the CVM does not transfer the request, but rather handles the request itself.

The CVM of the leader node may fulfil the input/output request (and/or request another component within/outside the cluster 100 to fulfil that request). Upon fulfilling the input/output request, the CVM of the leader node may send a response back to the CVM of the node from which the request was received, which in turn may pass the response to the user VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 is associated with a central management system that is configured to manage and control the operation of multiple clusters in the virtual computing system. In some embodiments, the central management system may be configured to communicate with the local management systems on each of the CVM 130, the CVM 145, the CVM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
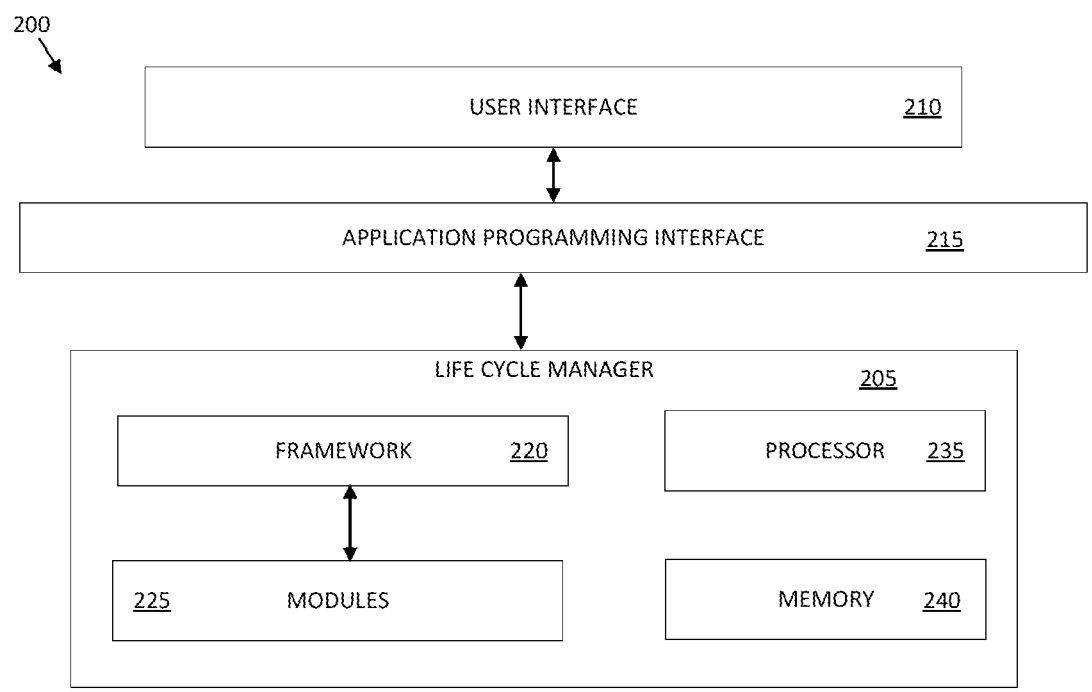
FIG. 2 is an example block diagram of an update system for updating components of the virtual computing system of FIG. 1, in accordance with some embodiments of the present disclosure.

Referring now to FIG. 2, an example block diagram of an update system 200 is shown, in accordance with some embodiments of the present disclosure. The update system 200 may be configured to upgrade components of the cluster 100. For example, the update system 200 may be configured to provide software and/or firmware upgrades. In some embodiments, the software and/or firmware upgrades may be one-click upgrades (e.g., a single click may start the update process). The update system 200 includes a Life Cycle Manager (LCM) 205 that tracks software and firmware versions of one or more entities in the cluster 100. In some embodiments, the LCM 205 may be configured to track software and firmware versions across a single cluster, while in other embodiments, the LCM may be configured to track the software and firmware versions across multiple clusters. Based on the tracking, the LCM 205 may decide, in some embodiments, whether a particular component is to be updated, and if so, the LCM may decide when to update that component (or make the update available for installation). In other embodiments, the LCM 205 may receive an indication (e.g., user input) to update a component, and in response to receiving that indication, the LCM may update that component. In some embodiments, the LCM 205 may be configured to perform the software and firmware updates of components or entities in a single cluster, while in other embodiments, the LCM may be configured to perform software and firmware updates across multiple clusters.

In some embodiments, the LCM 205 may be installed on the leader CVM (e.g., the CVM 130, the CVM 145, or the CVM 160) of a cluster. In other embodiments, the LCM 205 may be installed on one or more other designated CVM(s) (e.g., the CVM 130, the CVM 145, or the CVM 160, respectively). In some embodiments, the LCM 205 may be configured as a software service. In other embodiments, the LCM 205 may be configured as any combination of software, hardware, and/or firmware. In some embodiments, the LCM 205 may provide a one-click upgrade simplicity, automatic dependency management, unified upgrade process that provides multi hypervisor and multi hardware flexibility, while managing itself.

The LCM 205 may be configured to communicate with a user through a user interface 210 via an application programming interface ("API") 215. In some embodiments, a user may provide inputs to the LCM 205 for requesting/planning updates to an entity of the cluster 100, as well as to receive outputs from the LCM. In some embodiments, the user interface 210 may be accessed through or be a part of a management system or controller that manages/controls all of the nodes (e.g., the first node 105, the second node 110, or the third node 115) of a single cluster. In other embodiments, the user interface 210 may be part of a management system or controller that manages/controls multiples clusters.

The LCM 205 may form the backend of the update system 200, while the user interface 210 may form the front-end of the update system. The user may, via the user interface 210, instruct the LCM 205 to perform one or more operations. Upon receiving instructions from the user interface 210, the LCM 205 may perform actions consistent with those instructions. Thus, the LCM 205 is not visible to the user but is rather configured to operate under control of inputs received via the user interface 210, which is visible to and operated by the user. In some embodiments, the LCM 205 may be configured to perform certain operations autonomously without requiring any user input.

In some embodiments, the user interface 210 may be installed on a device associated with the management system described above. In other embodiments, instead of or in addition to being installed on a particular device, the user interface 210 may be hosted on a cloud service and may be accessed via the cloud. In some embodiments, the user interface 210 may additionally or alternatively be configured as a mobile application that is suitable for installing on and access from a mobile computing device (e.g., a mobile phone). Thus, the user interface 210 may be installed in a variety of ways.

Further, the user interface 210 may be configured to access the LCM 205 in a variety of ways. For example, in some embodiments, the user interface 210 may be configured to access the LCM 205 via the API 215. To access the LCM 205 via the API 215, users may access the user interface 210 via designated devices such as laptops, desktops, tablets, mobile devices, other handheld or portable devices, and/or other types of computing devices that are configured to access the API. These devices may be different from the device on which the LCM 205 is installed.

In some embodiments and when the user interface 210 is configured for use via the API 215, the users may access the LCM 205 via a web browser and upon entering a uniform resource locator ("URL") for the API. Using the API 215, the users may then send instructions to the LCM 205 and receive information back from the policy engine. In some embodiments, the API 215 may be a representational state transfer ("REST") type of API. In other embodiments, the API 215 may be any other type of web or other type of API (e.g., ASP.NET) built using any of a variety of technologies, such as Java, .NET, etc., that is capable of accessing the LCM 205 and facilitating communication between the users and the policy engine.

In some embodiments, the API 215 may be configured to facilitate communication between the users via the user interface 210 and the LCM 205 via a hypertext transfer protocol ("HTTP") or hypertext transfer protocol secure ("HTTPS") type request. The API 215 may receive an HTTP/HTTPS request and send an HTTP/HTTPS response back. In other embodiments, the API 215 may be configured to facilitate communication between the user interface 210 and the LCM 205 using other or additional types of communication protocols. In other embodiments, the user interface 210 may be configured to access the LCM 205 in other ways.

Thus, the user interface 210 provides a user interface that facilitates human-computer interaction between the users and the LCM 205. Thus, the user interface 210 is configured to receive user inputs from the users via a graphical user interface ("GUI") of the management system and transmit those user inputs to the LCM 205. The user interface 210 is also configured to receive outputs/information from the LCM 205 and present those outputs/information to the users via the GUI of the management system. The GUI may present a variety of graphical icons, visual indicators, menus, visual widgets, and other indicia to facilitate user interaction. In other embodiments, the user interface 210 may be configured as other types of user interfaces, including for example, text-based user interfaces and other man-machine interfaces. Thus, the user interface 210 may be configured in a variety of ways.

Further, the user interface 210 may be configured to receive user inputs in a variety of ways. For example, the user interface 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to send information to the LCM 205. The user interface 210 may also be configured to present outputs/information to the users in a variety of ways. For example, the user interface 210 may be configured to present information to external systems such as users, memory, printers, speakers, etc.

Therefore, although not shown, the user interface 210 may be associated with a variety of hardware, software, firmware components, or combinations thereof. Generally speaking, the user interface 210 may be associated with any type of hardware, software, and/or firmware component that enables the LCM 205 to perform the functions described herein.

Referring still to FIG. 2, the LCM 205 includes a framework 220 and one or more modules 225 (e.g., plug-ins) that may be configured to perform inventory and various update operations. Although the framework 220 and the modules 225 are shown as separate components, in some embodiments, those components may be integrated together, and the integrated component may perform the functions of the separate components, as disclosed herein. The framework 220 may be configured as a download manager for the modules 225. The framework 220 may act as an intermediary between a component being updated and the modules 225. Each of the modules 225 may include libraries, images, metadata, checksums for security, and other information for updating a component of the cluster 100. In some embodiments, the LCM 205 or at least portions thereof may be part of the operating system (e.g., Acropolis Operating System) of the cluster (e.g., the cluster 100) on which the LCM is located.

In some embodiments, before performing an update, the LCM 205 may be configured to take an inventory of the components (e.g., entities) on a cluster. For example, to take inventory, the LCM 205, and particularly, the framework 220 may be configured to identify and/or display what software and firmware various entities in a cluster contain. In some embodiments, the inventory may be taken on a node when the node comes online for the first time. In other embodiments, the inventory may be taken periodically. In some embodiments, the LCM 205 may take inventory autonomously without any user input. In some embodiments, the LCM 205 may receive a user input to take inventory, and the LCM may take inventory in response to the user input. The inventory may be displayed on the user interface 210. In some embodiments, the inventory may be taken by one of the modules 225 upon direction by the framework 220.

Further, the LCM 205, and particularly the framework 220 and/or the modules 225 may be configured as, and/or operate in association with, hardware, software, firmware, or a combination thereof. Specifically, the LCM 205 may include a processing unit or processor 235 configured to execute instructions for implementing the functionalities of the LCM 205. In some embodiments, each of the framework 220 and the modules 225 may have their own separate instance of the processor 235. The processor 235 may be implemented in hardware, firmware, software, or any combination thereof. "Executing an instruction" means that the processor 235 performs the operations called for by that instruction. The processor 235 may retrieve a set of instructions from a memory for execution. For example, in some embodiments, the processor 235 may retrieve the instructions from a permanent memory device like a read only memory (ROM) device and copy the instructions in an executable form to a temporary memory device that is generally some form of random access memory (RAM). The ROM and RAM may both be part of a memory 240, which in turn may be provisioned from the storage pool 170 of FIG. 1 in some embodiments. In other embodiments, the memory 240 may be separate from the storage pool 170 or only portions of the memory 240 may be provisioned from the storage pool. In some embodiments, the memory in which the instructions are stored may be separately provisioned from the storage pool 170 and/or the memory 240. The processor 235 may be a special purpose computer, and include logic circuits, hardware circuits, etc. to carry out those instructions. The processor 235 may include a single stand-alone processing unit, or a plurality of processing units that use the same or different processing technology. The instructions may be written using one or more programming language, scripting language, assembly language, etc.

Figure 3:
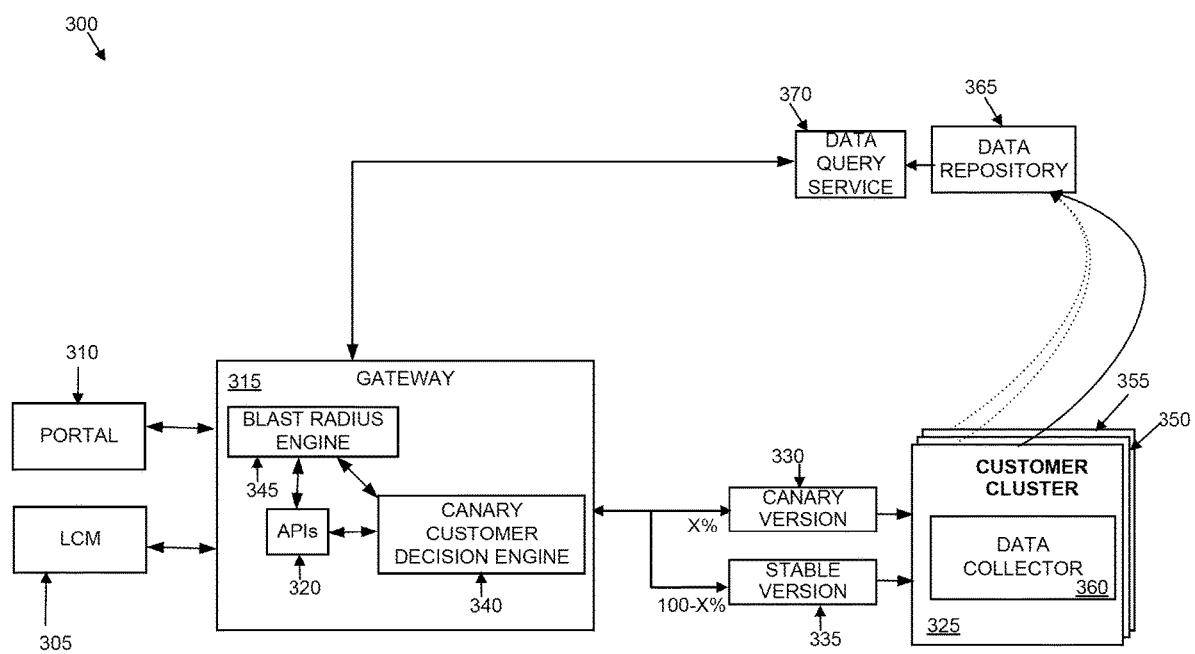
FIG. 3 is an example block diagram of an adaptive release system, in accordance with some embodiments of the present disclosure.

Turning now to FIG. 3, another example block diagram of an adaptive release system 300 is shown, in accordance with some embodiments of the present disclosure. The adaptive release system 300 shows additional details of the update system 200. Specifically, the adaptive release system shows an LCM 305 that may be configured to provide new updates to one or more customer clusters. The LCM 305 is similar to the LCM 205. Although not shown, the LCM 305 may similarly include a framework and one or more modules. The LCM 305 may also, similar to the LCM 205, be associated with a dashboard and include APIs to facilitate communication. In some embodiments, updates may be made available to customers via a portal 310 instead of the LCM 305. In some embodiments, the portal 310 may be a central location (e.g., website or other authenticated location) through which a customer may receive and download new updates for installation. In other embodiments, new updates may be made available to customers for download in other ways.

In some embodiments, the LCM 305, the portal 310, and any other mechanism that may supply updates to customers may be associated with a gateway 315. Although shown separately, in some embodiments, the gateway 315 may be part of the LCM 305 (e.g., part of the framework), part of the portal 310, or part of any other mechanism that may supply updates to customers. In other embodiments, the gateway 315 may be separate from the LCM 305, the portal 310, and any other mechanism that may supply updates to customers. For example, in some embodiments, the gateway 315 may be located in a central location and may be accessible to the LCM 305, the portal 310, and any other mechanism that may supply updates to customers. For example, in some embodiments, the gateway 315 may be located on a cloud server. In other embodiments, the gateway 315 may be located on-premise or any other suitable remote location.

Although not shown, in some embodiments, the gateway 315 may include a processor similar to the processor 235 to execute one or more instructions for performing the operations of the gateway, as described herein. The gateway 315 may also include a memory similar to the memory 240 to store data associated with the gateway (e.g., instructions to be executed by the processor, metadata, user data, etc.). Further, in some embodiments, the gateway 315 may communicate with a user through a user interface (not shown) and APIs 320. The user interface and the APIs 320 may be similar to the user interface 210 and the API 215, respectively, and therefore not described again.

The gateway 315 may be configured to decide how to make new updates available to a customer (e.g., customer cluster) 325. For example, in some embodiments, the gateway 315 may receive an indication (or determine in another way) that a new update is available for customers. This new update may be referred to as a canary version 330. Instead of making the canary version 330 available to all customers at the same time, the gateway 315 may be configured to perform a controlled release of the canary version. For example, in some embodiments, the gateway 315 may make the canary version 330 available initially to a selected group of one or more customers (e.g., X % of the customers). These selected group of one or more customers may be referred to as canary customers. The remaining customers who do not get the canary version may continue to use a previous or stable version 335. For example, if a software is being upgraded from version 2.0 to version 2.1, the version 2.1 may be the canary version 330 and the version 2.0 may be the stable version 335. The canary customers (e.g., X %) may receive the version 2.1 (e.g., the canary version 330). The remaining customers (e.g., (100−X) %) may continue to use the version 2.0 (e.g., the stable version 335). In some embodiments, the remaining customers who continue to use the stable version 335 may not see that a new update is available for that stable version (or may see that a new update is available but may be prevented from downloading/installing).

The gateway 315 may decide the canary customers using machine learning and customer data gathered from one or more customers. How the gateway 315 selects canary customers is discussed in greater detail below. Upon making the canary version 330 available to the canary customers, the canary customers may download/install the canary version. Additional data, called pulse data, may be collected from the canary customers upon downloading/installing the canary version. Based on the analysis of the pulse data, the gateway 315 may decide whether to adjust the pool of canary customers. For example, in some embodiments, the gateway 315 may decide that the canary version 330 was well accepted by the canary customers. In such cases, the gateway 315 may increase the pool of canary customers such that additional customers (e.g., Y %, with Y being greater than X) may receive the canary version. Thus, gradually, the pool of customers that receive the canary version may increase and the pool of customers that continue to use the stable version may decrease. Once all the customers (or greater than a predetermined percentage of customers) successfully receive/download/install the canary version, the canary version may be considered a stable version (e.g., the stable version 335).

On the other hand, if based on the analysis of the pulse data, the gateway 315 determines that the canary version 330 is not well accepted by the canary customers (e.g., the canary version is adversely impacting customers), the gateway may decide to reduce (or keep unchanged) the pool of canary customers. If reducing the pool of canary customers, the gateway 315 may identify the customers most negatively impacted by the canary version and return those customers to the stable version 335. How the gateway 315 decides to adjust the pool of canary customers is also discussed in greater detail below. Thus, based on network learning (e.g., analyzing data collected from customers), the gateway 315 may plan a controlled release of the canary version.

Thus, the gateway 315 may include a canary customer decision engine 340 that decides the pool of canary customers that receive the canary version 330. The gateway 315 may also include a blast radius engine 345 that decides how to adjust the pool of canary customers based on pulse data. Although the canary customer decision engine 340 and the blast radius engine 345 are shown as separate components, in some embodiments, those components may be combined together into a single engine, and the single engine may perform the operations of the individual engines. Further, although not shown, in some embodiments, either or both of the canary customer decision engine 340 and the blast radius engine 345 may have separate processors and memories to perform the operations described herein. The gateway 315 may include other or additional elements that may be needed or considered useful to have in performing the operations described herein.

As discussed above, the canary version 330 or the stable version 335 may be made available to a plurality of customers (e.g., customer clusters). For example, the canary version 330 or the stable version 335 may be made available to the customer 325 or customers 350 and 355. The terms "customer" and "customer clusters" are used interchangeably herein. When an update (whether the canary version 330 or the stable version 335) is described as for a "customer" herein, that update is configured for download and installation on a cluster associated with the customer, and particularly on one or more components (e.g., entities such as virtual machines, CVM, hypervisor, disk drives, network drives, etc.) associated with the cluster. Even though three customer clusters are shown in FIG. 3, in other embodiments, greater than or fewer than 3 customer clusters may be provided. Each of the customer clusters 325, 350, and 355 may be similar to the cluster 100 and include similar components as the cluster 100.

Each of the customer clusters 325, 350, and 355 may have an instance of a data collector 360 associated therewith. The data collector 360 may be configured as software, hardware, firmware, or combinations thereof. Further although not shown, in some embodiments, the data collector 360 may be associated with one or more processors and memories to perform the functions described herein. The data collector 360 may be configured to collect data from the underlying customer cluster 325, 350, 355. In some embodiments, the data collector 360 may be configured as an agent. The agent may be configured as a software, hardware, firmware, or a combination thereof. In some embodiments, the agent may be configured as an autonomous program that may be configured for performing one or more specific and approved operations (e.g., data collection). The agent may be associated with resources (e.g., CPU, memory, etc.) on the customer cluster (e.g., the customer cluster 325) that the agent resides on. In some embodiments, the agent may be installed on a virtual machine of the customer cluster (e.g., the customer cluster 325). In some embodiments, an instance of the agent may reside on each node of a particular customer cluster. In other embodiments, the agent may be installed on a node (e.g., the leader node) of the customer cluster and may be configured to collect data from all the nodes of the customer cluster. In some embodiments, a single agent may be configured to collect multiple types of data. In other embodiments, multiple agents, with each agent being configured to collect one or more types of data, may be associated with each cluster. In some embodiments, each agent may be configured with a configuration file that tells the agent which data to collect, when to collect, how to collect, where to send the collected data to, etc. In other embodiments, other or additional mechanisms may be used for collecting data from the underlying customer cluster (e.g., the customer clusters 325, 350, 355).

In some embodiments, the agent (or another mechanism that collects data) may be configured to poll certain databases, counters, logs, services, etc. to collect the data. The data collected by the data collector 360 may enable the gateway 315 to determine canary customers, as well as collect pulse data from canary customers. In some embodiments, separate agents may be used to collect data used for determining canary customers and to collect pulse data for adjusting the pool of canary customers. In some embodiments, the data collector 360 may be configured to collect data periodically or on demand. In some embodiments, the data collector 360 may run in the background on the underlying customer cluster.

In some embodiments, the data (e.g., first data) that is collected for determining canary customers may be categorized into customer profile data, customer health data, software health data, support system data, and financial impact data. Customer profile data may include hardware, software, and/or firmware details of clusters of a customer, cluster details (e.g., number of nodes, cluster configuration, etc.), customer upgrade history (e.g., how customer has handled updates previously), customer location, customer name, etc. Customer health data may include customer's satisfaction score (e.g., Net Promoter Score), number of errors/bugs/issues reported by customer, stability of customer clusters, etc. Software health data may include health of various software components after a release, while support system data may include availability of support to customer to resolve issues identified by the customer. Financial impact data may include data associated with revenue generated from customer and business arrangements with the customer. In general, for each category, the data that is collected may have either a categorical value or a Boolean value. A categorical value may include a specific value of data. For example, for an operating system, the categorical value may include the type and version of operating system (e.g., AOS 5.0, etc.). A Boolean value may include either a 0 value or a 1 value, each value indicative of one option. A Boolean value may be used where the data answers a Yes/No type question. For example, an example data may be related to whether a customer is a Beta testing partner. Based on the data collected, the answer may be Yes, the customer is a Beta testing partner or No, the customer is not a Beta testing partner. The Yes answer may be associated with a Boolean value (e.g., 1) and the No answer may be associated with the other Boolean value (e.g., 0).

Examples of each category of first data (e.g., data that may be used to determine canary customers) may include:

TABLE 1

First Data

| Category | Types of data collected | Examples of data collected | How data impacts weight selection | Example weight |
|---|---|---|---|---|
| Customer Profile Data | Customer Workload- Software (AOS/AHV/ESXi) version, Firmware versions, Hardware platforms (categorical (e.g., specific value)) | Allowed version AHV5.6 E.g., AHV 5.7 | Compatibility of canary version with stable version-assign positive weight if compatible and negative weight if not compatible. | 2 |
| | Customer Workload Size Number of nodes, blocks, clusters (categorical (e.g., specific range)) | E.g., 0-10, 10-50 50-200, 200-1000, 1000-10000 | Bigger the install base, lesser the capacity to take risk-assign positive weight if bigger install base and negative weight if smaller install base. | −1 |
| | Customer Workload- Does customer have software in existing environment (boolean) | E.g., 0 if no software in existing environment/ 1 if software present in existing environment | Positive weight if software already exist and negative weight if software does not exist | 1 |
| | Customer Profile- Nature of customer (e.g., leader or laggard in installing updates based on average time taken to upgrade new release in past) (boolean) | E.g., 0 if leader/ 1 if laggard | historical lag in taking new release-assign positive weight for less lag and negative weight for higher lag | −1 |
| | Customer Profile- Is customer a beta testing partner (boolean) | E.g., 0 if not beta testing partner/1 if beta testing partner | Beta customers likely take the release for early testing-assign positive weight for beta customers and | 1 |

TABLE 1-continued

| Category | Types of data collected | Examples of data collected | How data impacts weight selection | Example weight |
|---|---|---|---|---|
| | Has the customer enabled auto upgrades (boolean) | E.g., 0 if not enabled auto updates/1 is enabled auto updates | negative weight for non-beta customers Customers who have auto upgrades enabled are preferred more-assign positive weight for customers having auto updates available and negative weight for customers not having auto updates available | 2 |
| | Stability of release with customer hardware (categorical (e.g., specific value)) | E.g., AOS 15.1-DELL, HPE AOS 15.2-NX, FUJITSU | Assign positive weight if hardware stable with canary version and negative weight if hardware not stable with canary version | 1 |
| | Geolocation of customer (categorical (e.g., specific value)) | E.g., ASIA, EUROPE | Active support and engineering availability in time zone-assign positive weight if active support and engineering available at the location of the customer and negative weight if no active support and engineering available at the location of the customer | 2 |
| Customer health | Customer happiness index-Net Promoter Score (categorical (e.g., specific range)) | E.g., 0-5, 6-8, 9-10 | Assign positive weight for higher Net Promoter Score and negative weight for low Net Promoter Score | 2 |
| | Customer Temperature/Net Promoter Score before upgrade (average score in a predetermined past period (e.g., 1 month)) (categorical (e.g., specific range)) | E.g., 0-5, 6-8, 9-10 | Assign positive weight for higher Net Promoter Score and negative weight for low Net Promoter Score | 2 |
| | Number of support cases with customer (categorical (e.g., specific range)) | E.g., 0-10, 10-20, 20-50, 50-200 | Assign positive weight for few support cases and negative weight for many support cases | 1 |
| | Customer Profile-% of existing customer bugs fixed in new release (categorical (e.g., specific range)) | E.g., 0-10, 10-20, 20-50, 50-100 | If bugs experienced by customer are addressed in current release, target that customer for release-assign positive weight if bugs experienced by customer addressed and negative weight otherwise | 2 |
| Software health | Release Health-Number of net bugs impacted with release (categorical (e.g., specific range)) | E.g., -100-(-50), -50-(-20), -20-0, 0-20, 20-50, 50-100 | number of bugs fixed v. number of new bugs-assign positive weight if few new bugs and negative weight if large number of new bugs | 1 |
| | Release Health-Number of customers on new release (categorical (e.g., specific range)) | E.g., 0-10, 10-20, 20-50, 50-100, 100-500 | Assign weight based on number of customers on new release | 2 |
| | Release Health-Active Discoveries/Alerts for the release per node (categorical (e.g., specific range)) | E.g., 0-10, 10-20, 20-50, 50-100, 100-500 | Assign positive weight for few alerts and negative weight for large number of alerts | -1 |
| | Release Nature-Does release contain must have fixes (e.g. address critical security issue) (boolean) | E.g., 0 if yes/ 1 if no | Assign positive weight if update addresses critical security issues, otherwise negative weight | 2 |
| Support system | Supportability Profile-availability in region (categorical (e.g., specific range)) | E.g., high, medium, low (e.g., 3, 2, 1) | availability of support positively impact outcome-assign positive weight if support available and negative weight otherwise | 1 |
| | Existing blast radius (categorical (e.g., specific range)) | E.g., 0-10%, 10-20%, . . . , 90-100% | Larger the blast radius, greater is the number of customers who see the new release-assign weight based on blast radius | 1 |
| Financial Impact | Revenue generated from customer or number of active licenses that a customer owns. It may be closely related to number of nodes/clusters a customer owns (categorical (e.g., specific range)) | E.g., high, medium, low (e.g., 3, 2, 1) | Assign weight based on revenue | -1 |
| | new deal in pipeline with customer (boolean) | E.g., 0 if yes/ 1 if no | Assign positive weight if no new deal in pipeline and negative weight if new deal in pipeline | 1 |

Further, in some embodiments, the data collector 360 may collect pulse data (e.g., second data) from canary customers. The second data may be used to adjust (e.g., increase or decrease) the pool of canary customer. Similar to the first data, the second data may be categorical or Boolean. Examples of second data may include:

TABLE 2

| | | | Second Data | |
|---|---|---|---|---|
| Category | Types of data collected | Examples of data collected | How data impacts weight selection | Example weight |
| Pulse | System usage Metrics (categorical (e.g., specific range)) | E.g., −50-(−20)%, −20-0% 0-20%, 20-50% | Assign weight based on difference between CPU usage and Memory usage after and before release for upgraded customers (for same usage) | −1 |
| | Health Checks (boolean) | 0 if health check not cleared/1 if health check cleared | If the health check has passed, greater the chances of scaling up- assign positive weight if health check passed, assign negative weight otherwise | 1 |
| | Number of alerts generated from the cluster automatically (categorical (e.g., specific range)) | E.g., −50-(−20)%, −20-0% 0-20%, 20-50% | If number of alerts per node is more (difference between after and before release), the chances of scaling up are less-assign positive weight if fewer alerts and negative weight if larger number of alerts | −2 |
| Support cases | Number of support cases generated per node for the canary version released compared to stable version (categorical (e.g., specific range)) | E.g., −50-(−20)%, −20-0% 0-20%, 20-50% | Greater the number of support cases per node (difference between after and before release), the chances of scaling up are less- assign positive weight if fewer support cases and negative weight if larger number of support cases | −2 |
| Escalations | Number of Escalations per node for the canary version released (categorical (e.g., specific range)) | E.g., −50-(−20)%, −20-0% 0-20%, 20-50% | Greater the number of open escalations (difference between after and before release), the chances of scaling up are less- assign positive weight if fewer open escalations and negative weight if larger number of open escalations | −2 |
| Customer feedback | Feedback collected for canary version (categorical (e.g., specific range)) | E.g., −50-(−20)%, −20-0% 0-20%, 20-50% | Assign positive weight if positive feedback and negative weight if negative feedback | 2 |
| Version downgrade | Number of customers who downgraded back to the stable version from the canary version (categorical (e.g., specific range)) | E.g., −50-(−20)%, −20-0% 0-20%, 20-50% | Greater the number of customers downgrading after the upgrade, lesser the chances of seeing an release-assign positive weight if fewer customers downgrading and negative weight if larger number of customers downgrading | −3 |
| Customer satisfaction | Average Net Promoter Score gain for customers on canary release (e.g., change in score after the canary version relative to before the upgrade) (categorical (e.g., specific range)) | E.g., −50-(−20)%, −20-0% 0-20%, 20-50% | | |
| Number of customer on new release | Number of customers on new release (categorical (e.g., specific range)) | E.g., 0-20, 20-50, 50-200, 200-10000 | | 3 |

TABLE 2-continued

Second Data

| Category | Types of data collected | Examples of data collected | How data impacts weight selection | Example weight |
|---|---|---|---|---|
| Delta between current and blast radius | Number of possible customer on new release-number of customers on new release now (categorical (e.g., specific range)) | E.g., 0-10, 10-20, 20-50, 50-200 | | |

It is to be understood that the categories of first data and second data mentioned above are only an example, and not intended to be limiting in any way. Further, the specific types of first and/or second data that is collected in each category as noted in the tables above are also only an example and not intended to be limiting in any way. In other embodiments, additional or other types of first and/or second data may be collected in each category. Likewise, the examples of first and/or second data collected are also only for explanation and not intended to be limiting.

The first data in Table 1 above may be collected from each customer cluster (e.g., the customer clusters 325, 350, 355). In some embodiments, the first data collected from the customer clusters (e.g., the customer clusters 325, 350, 355) may be used to select canary customers, as discussed further below. The second data in Table 2 may be collected from only canary customers to determine the change in pool of the canary customers. In some embodiments, the second data may be collected after the canary customers install the canary version of an upgrade.

In some embodiments, the data collector 360 may transmit the collected first data and second data to a data repository 365. In some embodiments, the data collector 360 may send the collected first data and second data to the data repository 365 as soon as that data are collected. In other embodiments, the data collector 360 may send the collected first data and second data to the data repository 365 periodically (e.g., every 6 hours or at other pre-determined time intervals). The data repository 365 is configured to at least store the collected first data and second data from multiple customer clusters (e.g., the customer clusters 325, 350, 355). For example, the data repository 365 may receive the collected first data and second data from the customer clusters 325, 350, and 355, and at least temporarily store the collected first data and second data. In some embodiments, separate data repositories may be used to store the first data and the second data. In some embodiments, the data repository 365 may include one or more storage devices. Further, in some embodiments, the data repository 365 may be located in a cloud or on-premises.

Data from the data repository 365 may be retrieved by a data query service 370 for sending to the gateway 315. In some embodiments, the data query service 370 may be configured to perform certain pre-processing on the retrieved data before sending that data to the gateway 315. For example, in some embodiments, the data query service 370 may convert any non-numeric data into numeric data. In other embodiments, the data query service 370 may be configured to convert the format of data into standardized or normalized formats. For example, if the supported hypervisor types include AHV, ESX, Hyper-V, Zen, they may be normalized to integers 1, 2, 3, and 4, respectively. In some embodiments, the data query service 370 may perform hot key encoding, missing feature handling, and other types of data manipulation operations. In other embodiments, yet other types of pre-processing may be performed. In some embodiments, the pre-processing that is performed may be based on the machine learning algorithm that is used in the gateway 315. In other embodiments, the pre-processing may be based on other factors.

Further, even though the data query service 370 is described as performing the pre-processing, in other embodiments, the data collector 360 or another component may perform the pre-processing. In yet other embodiments, the pre-processing may not be performed. The data query service 370 may be configured to receive the collected first data and second data (e.g., at pre-determined time intervals) from the data repository 365 and supply those collected first data and second data to the gateway 315. Although a single data query service (e.g., the data query service 370) is shown to receive both the first data and the second data, in some embodiments, separate data query services for the first data and the second data may be used. Further, although the data query service 370 and the data repository 365 are shown separate from the gateway 315, in some embodiments, either or both of those components may be part of the gateway.

Additionally, in some embodiments, the data query service 370 and/or the gateway 315 may reside in a cloud or on-premise, similar to the data repository 365. In some embodiments, the data query service 370 may be configured to automatically retrieve the collected first data and second data (e.g., the newest set of collected first data and second data received from the data collector 360) from the data repository 365 and send the retrieved collected first data and second data to the gateway 315. In other embodiments, the gateway 315 may be configured to periodically query the data query service 370 for the collected first data and second data. Upon receiving the query from the gateway 315, the data query service 370 may retrieve the collected first data and second data from the data repository 365 and send the retrieved first data and second data to the gateway. In some embodiments, to retrieve the collected first data and second data from the data repository 365, the data query service 370 may send a request to the data repository. In some embodiments, the request may identify which of the collected first data and/or second data to retrieve. In some embodiments, the request may additionally or alternatively identify the time period from which to retrieve the collected first data and second data. In some embodiments, the request may additionally or alternatively identify the customer cluster (e.g., the customer cluster 325, 350, 355) whose collected first data and/or second data are to be retrieved. In some embodiments, all newly added collected first data and second data may be retrieved. For example, in some embodiments, when a canary version is released and the gateway is to identify the canary customers, the data query service 370 may retrieve first data. Similarly, when the gateway is to adjust the pool of canary customers, the data query service 370 may retrieve second data.

In some embodiments, the canary customer decision engine 340 may receive the first data to identify canary customers, while the blast radius engine 345 may receive the second data to adjust the pool of canary customers. In some embodiments, the canary customer decision engine 340 and the blast radius engine 345 may each include, or be associated with, a machine learning/artificial intelligence engine implementing a machine learning/artificial intelligence model (e.g., machine learning/artificial intelligence algorithm). The terms "machine learning" and "artificial intelligence" are used interchangeably herein. In some embodiments, the canary customer decision engine 340 and/or the blast radius engine 345 may be trained periodically (e.g., every few hours, every few days, or at other predetermined time periods) using training data or test data. By virtue of continually training the canary customer decision engine 340 and/or the blast radius engine 345, the accuracy of predictions of the canary customer decision engine and the blast radius engine may be continuously refined and improved. In some embodiments, the canary customer decision engine 340 and/or the blast radius engine 345 may be trained with different set of training data/algorithms. The set of training data/algorithm which yields the best results on test data may be selected.

In some embodiments, the algorithms that may be used to train the canary customer decision engine 340 and/or the blast radius engine 345 may include a Feedforward Artificial Neural Network (e.g., a Multi-layer Perceptron ANN (artificial neural network)), or other neural networks may be used. In some embodiments, a Keras machine learning model may be used for implementing the canary customer decision engine 340 and/or the blast radius engine 345. In other embodiments, other machine learning models may be used. Further, in some embodiments, the training data that is used to train the canary customer decision engine 340 and/or the blast radius engine 345 may include historical first data (e.g., the first data from the past) and historical second data (e.g., the second data from the past), respectively, which has been collected from the customer clusters 325, 350, 355. In other embodiments, the training data may include first data and second data collected from or created from other sources. Using the training data, the machine learning model (e.g., Keras) may be trained and tested using a test data set. The test data set may include historical first and second data from the customer clusters 325, 350, 355, or data created/generated from other sources.

Referring specifically to the canary customer decision engine 340, the canary customer decision engine may be configured to identify canary customers. To identify canary customers, the canary customer decision engine 340 may first be trained. In some embodiments, the canary customer decision engine 340 may be trained in the following steps:

Step 1—read the data file (e.g., training data and test data)
Step 2—pre-process the data read from the data file
Step 3—divide the data into training data and test data, assuming X is input and y is output X_train, X_test, y_train, y_test=train_test_split (X, y, test_size=0.33, random_state=42)
Step 4—apply the data to the machine learning model (e.g., Keras). Each layer of the neural network may apply the following operation:

output=activation(dot(input,weight/kernel)+bias)

In some embodiments, the bias may be set as "true," while the weight may be initialized using "he" weight initialization, which is standard with a Rectified Linear Unit (ReLU). In some embodiments, the weight may be set as:

Weight=$G(0.0, \text{sqrt}(2/n))$

In some embodiments, random numbers may be used as weights instead of some initialized weightage to take into account the non-linearity of activation functions (e.g., ReLU). The above output operation may be applied to a Keras model as follows for a final prediction:

initializer=keras.initializers.HeNormal( )
model=Sequential( )
model.add(Dense(20, input_dim=20, activation='relu'))
model.add(Dense(8, activation='relu'))
model.add(Dense(1, activation='sigmoid'))
compile the keras model
model.compile(loss='binary_crossentropy', optimizer='adam', metrics=['accuracy'])
fit the keras model on the dataset
model.fit(X, y, epochs=150, batch_size=10)
evaluate the keras model
_, accuracy=model.evaluate(X, y)
Step 5: predict value: y_pred=model.predict(X_test)
Step 6: Evaluate the model Score=model.evaluate(X_test,y_test,verbose=1)

Thus, in some embodiments, the canary customer decision engine 340 may be trained to output a score. In some embodiments, the score may be customer satisfaction score. Thus, in some embodiments, the machine learning model of the canary customer decision engine 340 may be trained to optimize the customer satisfaction score. In some embodiments, the customer satisfaction score may be an average customer satisfaction score over a period of time (e.g., 1 month). Thus, in some embodiments, the machine learning model of the canary customer decision engine 340 may be trained to optimize the customer satisfaction score.

Upon being trained, the canary customer decision engine 340 may receive first data from a customer cluster (e.g., the customer cluster 325) to determine if that customer cluster is suitable to be a canary customer. For example, in some embodiments, the first data may be applied to the trained machine learning model of the canary customer decision engine 340 to obtain a customer satisfaction score for that customer. In some embodiments, the canary customer decision engine 340 may determine if a customer is suitable to be a canary customer based on the customer satisfaction score. For example, if the customer satisfaction score for a particular customer is greater than a predefined threshold, the canary customer decision engine 340 may determine that the customer is suitable to be a canary customer. Likewise, if the customer satisfaction score for a particular customer is less than the predefined threshold, the canary customer decision engine 340 may determine that the customer is not suitable to be a canary customer. Thus, the canary customer decision engine 340 may receive first data from multiple customer clusters, and for each customer cluster, the canary customer decision engine may determine if that customer cluster is suitable to be a canary customer based on that customer's customer satisfaction score.

Turning now to the blast radius engine 345, the blast radius engine may be configured to adjust the pool of canary customers determined by the canary customer decision engine 340. Adjusting the pool of canary customers may include increasing the number of customers who get the canary version or reducing the number of customers who get the canary version. As used herein, adjusting the pool of canary customers that receive the canary version is referred to as a "blast radius." Thus, the blast radius engine 345 may be configured to increase the blast radius (e.g., make the canary version available to more customers) or reduce the blast radius (e.g., make the canary version available to fewer customers).

In some embodiments, to adjust the blast radius, the blast radius engine 345 may be associated with a machine learning model, as discussed above. In some embodiments, the machine learning model may be trained to predict the blast radius. In some embodiments, the machine learning model may be trained as follows:

Step 1—read the data file (e.g., training data and test data)
Step 2—pre-process the data read from the data file
Step 3—divide the data into training data and test data, assuming X is input and y is output: X_train, X_test, y_train, y_test=train_test_split (X, y, test_size=0.33, random_state=42)
Step 4—apply the data to the machine learning model (e.g., Keras). Each layer of the neural network may apply the following operation:

output=activation(dot(input,weight/kernel)+bias)

In some embodiments, the bias may be set as "true," while the weight may be initialized using "he" weight initialization, which is standard with a Rectified Linear Unit (ReLU). In some embodiments, the weight may be set as:

Weight=$G(0.0, \text{sqrt}(2/n))$

In some embodiments, random numbers may be used as weights instead of some initialized weightage to take into account the non-linearity of activation functions (e.g., ReLU).

The above output operation may be applied to a Keras model as follows for a final prediction:

initializer=keras.initializers.HeNormal( )
model=Sequential( )
model.add(Dense(7, input_dim=7, activation='relu'))
model.add(Dense(3, activation='relu'))
model.add(Dense(1, activation='sigmoid'))
compile the keras model
model.compile(loss='binary_crossentropy', optimizer='adam', metrics=['accuracy'])
fit the keras model on the dataset
model.fit(X, y, epochs=150, batch_size=10)
evaluate the keras model
_, accuracy=model.evaluate(X, y)
Step 5: predict value: y_pred=model.predict(X_test)
Step 6: Evaluate the model Score=model.evaluate($X\_test, y\_test$, verbose=1)

Thus, in some embodiments, the blast radius engine 345 may be trained to output a score. In some embodiments, the score may be indicative of a predicted blast radius. The blast radius engine 345 may compare the predicted blast radius with the blast radius used in the current cycle and adjust the blast radius accordingly, as discussed in further detail below. Upon being trained, the blast radius engine 345 may receive the second data. As noted above, the second data may be collected from current canary customers who have installed the canary version. The second data may be applied to the machine learning model of the blast radius engine 345. Based on the predicted blast radius predicted by the machine learning model of the blast radius engine 345, the blast radius engine may adjust the blast radius.

It is to be understood that only certain elements of the adaptive release system 300 are shown in FIG. 3. Nevertheless, other components that may be needed or considered useful to have in performing the functions described herein may be provided in the adaptive release system 300.

Figure 4:
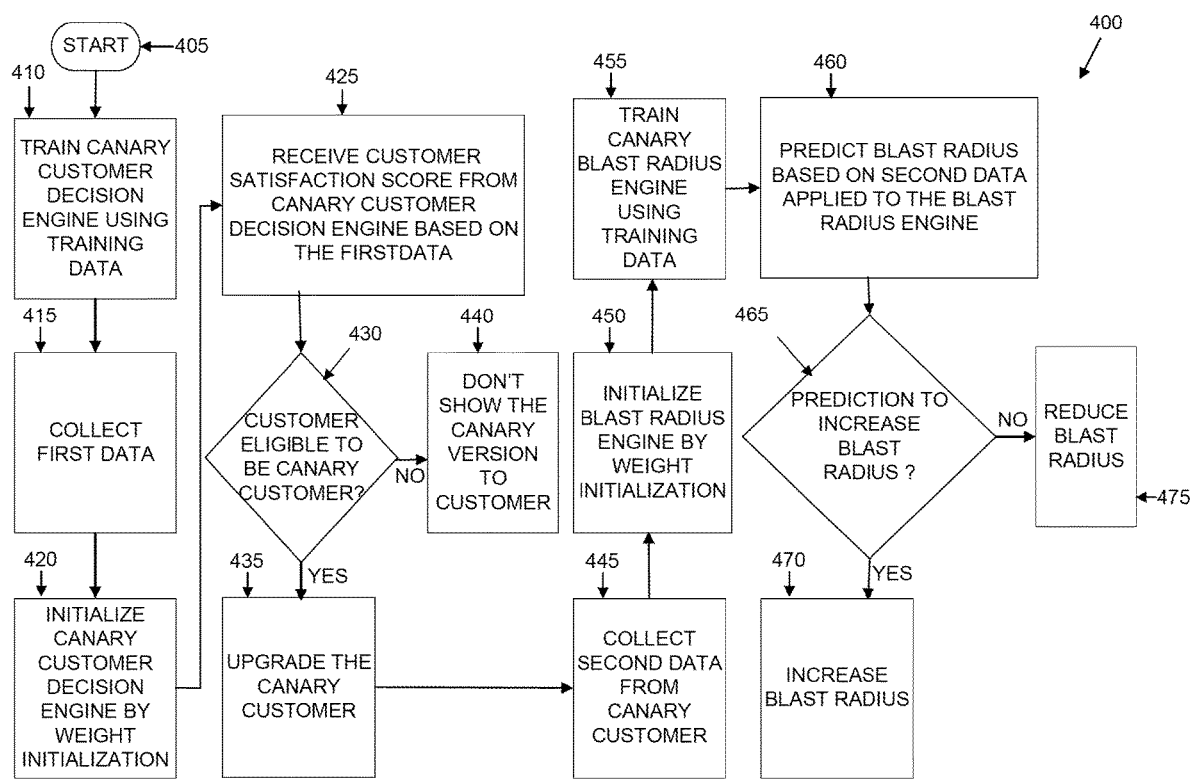
FIG. 4 is an example flowchart outlining operations for making an update available to a customer using the adaptive release system of FIG. 3, in accordance with some embodiments of the present disclosure.

Referring now to FIG. 4, an example flowchart outlining operations of a process 400 is shown, in accordance with some embodiments of the present disclosure. The process 400 may include other or additional operations depending upon the embodiment. The process 400 may be implemented by the gateway 315. The process 400 starts at operation 405 when a new canary version release is available. Upon starting at the operation 405, the gateway 315, and particularly the machine learning model of the canary customer decision engine 340, is trained at operation 410. In some embodiments, the canary customer decision engine 340 may be trained even before the process 400 starts. In other words, the training of the canary customer decision engine 340 need not be dependent upon the availability of a canary version. The canary customer decision engine 340 may be trained as discussed above in FIG. 3 using a training set.

At operation 415, first data is collected from a customer cluster (e.g., the customer cluster 325). In some embodiments, the process 400 may be run for each customer cluster (e.g., the customer clusters 325, 350, 355) on which the canary version is to be ultimately installed. In some embodiments, the first data that is collected may be data that is described above in Table 1. In other embodiments, other or additional types of data may be collected. The first data may be collected using the data collector 360 and sent to the data repository 365. In some embodiments, the first data may be pre-processed as discussed above. From the data repository 365, the data query service 370 may send the first data to the canary customer decision engine 340. At operation 420, the canary customer decision engine 340 may initialize the machine learning model.

In some embodiments, the initializing of the machine learning model may include assigning weights to each piece of first data. In some embodiments, the weights that are applied to the collected first data in outputting the score may be varied. In other words, the weights may be dynamic. For example, and as described in Table 1 above, each piece of data may be assigned weights based on the value of the data. Specifically, some types/values of first data may contribute more to the corresponding prediction of the score than other data. Thus, depending upon the type of data and the value of the data collected, different weights may be assigned to each type of data. For example, one piece of data relating to the first data may include whether a customer is a Beta testing partner. A higher weight may be assigned if a customer is a Beta testing partner and a lower weight may be assigned if a particular customer is not a Beta testing partner. The criteria for assigning weights for various types of first data is described in Table 1 above. In other embodiments, depending upon the type of the machine learning model, other types of operations may be performed for initializing the machine learning model of the canary customer decision engine 340. It is to be understood that the criteria, as well as the example weights in Table 1 above are only an example, and not intended to be limiting in any way.

In some embodiments, the weights that are used during training the canary customer decision engine 340 may be determined internally by the neural network (e.g., the machine learning algorithm). For example, in some embodiments, a cost function for the average difference between computed results obtained from the training set and actual outputs generated by the neural network may be defined.

The neural network may be configured to optimize this cost function by tuning the weights for different layers. In other embodiments, the weights may be determined in other ways. Thus, optimized weights to be applied may be determined during training.

Upon initializing the machine learning model of the canary customer decision engine 340, at operation 425, the first data is applied to the machine learning model of the canary customer decision engine. The application of the first data to the machine learning model of the canary customer decision engine 340 results in a customer satisfaction score. At operation 430, the gateway 315, and particularly the canary customer decision engine 340, determines if the customer is eligible to be a canary customer. For example, in some embodiments, the canary customer decision engine 340 may compare the customer satisfaction score with a threshold customer satisfaction score. If the customer satisfaction score is greater than or equal to the threshold customer satisfaction score, the canary customer decision engine 340 may determine that the customer is eligible to be a canary customer, and the process 400 proceeds to operation 435. On the other hand, if the canary customer decision engine 340 determines that the customer satisfaction score is less than the threshold customer satisfaction score, the canary customer decision engine determines that the customer is not eligible to be a canary customer at operation 440. The customer may then not receive the canary version release until the blast radius is increased and the customer falls within the blast radius, the customer is evaluated again for being a canary customer, or when the canary version becomes a stable version.

At the operation 435, the canary customer is upgraded with the canary version. In some embodiments, the canary customer may be automatically updated using the LCM 305. In other embodiments, the canary customer may be upgraded in other ways. Upon upgrading the canary customer with the canary version release at the operation 435, pulse data (e.g., second data) is collected from the canary customer. In some embodiments, the second data that is collected may be data that is described above in Table 2. In other embodiments, other or additional types of data may be collected. The second data may be collected using the data collector 360 and sent to the data repository 365. In some embodiments, the second data may be pre-processed as discussed above. From the data repository 365, the data query service 370 may send the second data to the blast radius engine 345.

The blast radius engine 345 may initialize the machine learning model of the blast radius engine at operation 450. In some embodiments, the initializing of the machine learning model of the blast radius engine 345 may include assigning weights to each piece of second data. For example, and as described in Table 2 above, each piece of second data may be assigned weights based on the value of the second data. Other considerations may apply to the assignment of the weights as discussed above with respect to the canary customer decision engine 340. It is to be understood that the criteria, as well as the example weights in Table 2 above are only an example, and not intended to be limiting in any way.

In other embodiments, depending upon the type of the machine learning model of the blast radius engine 345, other types of operations may be performed for initializing the machine learning model of the blast radius engine 345. At operation 455, the machine model of the blast radius engine 345 is trained. Although the machine learning model of the blast radius engine 345 is described as being trained after collecting the second data, it is to be understood that the machine learning model may be trained at the operation 410 along with the machine learning model of the canary customer decision engine 340, before the start of the process 400, before or along with the collection of the second data, or at any other point of time. As discussed above, the machine learning model of the blast radius engine 345 may be periodically trained to improve accuracy of prediction. In some embodiments, the machine learning model of the blast radius engine 345 may be trained as discussed above.

At operation 460, the second data from the operation 445 is applied to the trained machine learning model of the blast radius engine 345 to output a predicted blast radius. The predicted blast radius may be used to decide whether to increase the blast radius or decrease the blast radius at operation 465. Specifically, at the operation 465, the blast radius engine 345 compares the predicted blast radius from the operation 460 with the previous blast radius. More specifically, the release of the canary version may occur in cycles. In each cycle, the canary version may be released to a predicted group of customers (e.g., canary customers). Further, each cycle may be associated with a blast radius. For example, in some embodiments, the first cycle of the canary version release may include a predefined blast radius or initial blast radius. For example, in some embodiments, the initial blast radius may be set as 10%—meaning that 10% of all customers may be selected as canary customers. Thus, for example, if the canary version is intended to be eventually released to 100 customers, 10% customers or 10 customers may be selected as canary customers for the first cycle. In other embodiments, the blast radius may be set as a geographic location. For example, in some embodiments, if the blast radius is set as Europe, then canary customers may only be selected (as discussed above using first data) from customers in Europe. In other embodiments, the blast radius may be set as a percentage and include a geographic location. For example, in some embodiments, the initial blast radius may be limited to 10% of customers in Europe. In such a case, if there are 10 customers in Europe, only 1 of them may be selected as a canary customer. In other embodiments, the initial blast radius may be selected in other ways.

In some embodiments, there may be no initial blast radius for the first cycle. For example, in some embodiments, all customers that are intended to eventually receive the canary version may be considered for being a canary customer. All customers who qualify to being a canary customer, as described above, may be selected. The concept of blast radius may then be introduced in the second cycle. Thus, whether the first cycle is associated with a specific blast radius or not, the second cycle may be associated with a blast radius. This blast radius for the second cycle may be based on the blast radius for the second cycle predicted by the machine learning model of the blast radius engine 345. In some embodiments, the blast radius engine 345 may compare the blast radius of the current cycle with the blast radius predicted by the machine learning model of the blast radius engine 345 for the next cycle. If the predicted blast radius for the next cycle is greater than the blast radius of the previous cycle (e.g., immediately prior cycle), the blast radius engine 345 may determine that the canary customers received the canary version release positively and that the canary version may be released to additional customers. On the other hand, if the predicted blast radius for the next cycle is less than the blast radius of the previous cycle, then the blast radius engine 345 may determine that customers are having trouble with the canary version (e.g., the canary version is adversely impacting customer clusters) and that the blast radius needs to be reduced. If the predicted blast radius for the next cycle is same as the blast radius for the previous cycle, then the blast radius may be kept same.

In some embodiments, the blast radius may include a range. For example, in some embodiments, the blast radius may include 0-10% of the customers, 10-20% of the customers, 20-30% of the customers, 30-40% of the customers, . . . 90-100% of the customers. Depending upon the blast radius in the current cycle and the predicted blast radius for the next cycle, the blast radius engine 345 may determine the blast radius for the next cycle. For example, if the blast radius in the current cycle and the predicted blast radius for the next cycle fall within the same range, the blast radius engine 345 may keep the same blast radius. If the predicted blast radius for the next cycle has a greater range than the blast radius for the current cycle, the blast radius engine 345 may determine if the canary version has been installed within a first predetermined minimum percentage (e.g., 20%) of customers and if a second predetermined minimum percentage (e.g., 70%) of those customers that have installed the canary version have positive feedback. If so, the blast radius engine 345 may increase the blast radius range to the next upper range. For example, if the blast radius in the current cycle was 0-10%, the blast radius engine 345 may go up to 10-20%.

On the other hand, if the predicted blast radius range for the next cycle is less than the current blast radius range, the blast radius engine 345 may determine if the canary version has been installed within a first predetermined minimum percentage (e.g., 20%) of customers and if a second predetermined minimum percentage (e.g., 30%) of those customers that have installed the canary version have negative feedback. If so, the blast radius engine 345 may decrease the blast radius range. For example, if the current blast radius range is 10-20%, the blast radius engine 345 may go down to 0-10%. If the current blast radius is already at the lowest blast radius range, the blast radius engine 345 may keep the blast radius unchanged.

Thus, at the operation 465, the blast radius engine 345 determines if the blast radius is to increase or decrease. If the blast radius engine 345 determines that the blast radius has to increase, the process 400 moves to operation 470 where the blast radius is increased as discussed above. If the blast radius engine 345 determines that the blast radius has to decrease, the process 400 proceeds to operation 475 where the blast radius is reduced as also discussed above.

It is to be understood that any examples used herein are simply for purposes of explanation and are not intended to be limiting in any way. It is also to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by a processor in a virtual computing system, first data from a group of customers intended to receive an update;
   identifying, by the processor, a subset of customers from the group of customers based on the first data for receiving a canary version of the update;
   facilitating installation, by the processor, of the canary version of the update on each of the subset of customers;
   receiving, by the processor, second data from each of the subset of customers upon installation of the canary version of the update;
   predicting, by the processor, whether the subset of customers that receive the canary version is to increase or decrease based on the second data; and
   adjusting, by the processor, a number of customers in the subset of customers for receiving the canary version of the update based on the prediction.

2. The method of claim 1, wherein the first data comprises at least one of a customer profile data, customer health data, software health data, support system data, or financial impact data for each of the group of customers.

3. The method of claim 1, wherein adjusting the number of customers in the subset of customers comprises increasing the number of customers that receive the canary version of the update.

4. The method of claim 1, wherein adjusting the number of customers in the subset of customers comprises decreasing the number of customers that receive the canary version of the update.

5. The method of claim 1, wherein the group of customers that are not in the subset of customers receive a stable version of the update.

6. The method of claim 1, wherein identifying the subset of customers for receiving the canary version of the update comprises:
   computing, by the processor, a customer satisfaction score for a customer in the group of customers; and
   adding, by the processor, the customer to the subset of customers upon determining that the customer satisfaction score of the customer is greater than or equal to a threshold score value.

7. The method of claim 6, wherein the customer satisfaction score is computed using a machine learning model trained using historical first data.

8. The method of claim 1, wherein predicting whether the subset of customers is to increase or decrease comprises determining, by the processor, a predicted range of percentage of the group of customers to receive the canary version of the update.

9. The method of claim 8, wherein adjusting the number of customers in the subset of customers based on the prediction comprises:
   determining, by the processor, a current range of percentage of the group of customers that are part of the subset of customers;
   comparing, by the processor, the current range of percentage with the predicted range of percentage; and
   adjusting, by the processor, the number of customers in the subset of customers based on the comparison.

10. The method of claim 9, wherein upon determining that the predicted range of percentage is greater than the current range of percentage, adjusting the number of customers in the subset of customers comprises increasing, by the processor, the number of customers in the subset of customers.

11. The method of claim 9, wherein upon determining that the predicted range of percentage is less than the current range of percentage, adjusting the number of customers in the subset of customers comprises decreasing, by the processor, the number of customers in the subset of customers.

12. A non-transitory computer-readable media comprising computer-readable instructions stored thereon that when executed by a processor associated with a virtual computing system cause the processor to perform a process comprising:
   receiving first data from a group of customers intended to receive an update;
   identifying a subset of customers from the group of customers based on the first data for receiving a canary version of the update;
   facilitating installation of the canary version of the update on each of the subset of customers;
   receiving second data from each of the subset of customers upon installation of the canary version of the update;
   predicting whether the subset of customers that receive the canary version is to increase or decrease based on the second data; and
   adjusting a number of customers in the subset of customers for receiving the canary version of the update based on the prediction.

13. The non-transitory computer-readable media of claim 12, wherein the first data comprises at least one of a customer profile data, customer health data, software health data, support system data, or financial impact data for each of the group of customers.

14. The non-transitory computer-readable media of claim 12, wherein adjusting the number of customers in the subset of customers comprises increasing the number of customers that receive the canary version of the update.

15. The non-transitory computer-readable media of claim 12, wherein adjusting the number of customers in the subset of customers comprises decreasing the number of customers that receive the canary version of the update.

16. The non-transitory computer-readable media of claim 12, wherein the group of customers that are not in the subset of customers receive a stable version of the update.

17. The non-transitory computer-readable media of claim 12, wherein for identifying the subset of customers for receiving the canary version of the update, the processor further executes computer-readable instructions for:
   computing a customer satisfaction score for a customer in the group of customers; and
   adding the customer to the subset of customers upon determining that the customer satisfaction score of the customer is greater than or equal to a threshold score value.

18. The non-transitory computer-readable media of claim 17, wherein the customer satisfaction score is computed using a machine learning model trained using historical first data.

19. The non-transitory computer-readable media of claim 12, wherein for predicting whether the subset of customers is to increase or decrease, the processor further executes computer-readable instructions for determining a predicted range of percentage of the group of customers to receive the canary version of the update.

20. The non-transitory computer-readable media of claim 19, wherein for adjusting the number of customers in the subset of customers based on the prediction, the processor further executes computer-readable instructions for:
  determining a current range of percentage of the group of customers that are part of the subset of customers;
  comparing the current range of percentage with the predicted range of percentage; and
  adjusting the number of customers in the subset of customers based on the comparison.

21. The non-transitory computer-readable media of claim 20, wherein upon determining that the predicted range of percentage is greater than the current range of percentage, for adjusting the number of customers in the subset of customers, the processor further executes computer-readable instructions for increasing the number of customers in the subset of customers.

22. The non-transitory computer-readable media of claim 20, wherein upon determining that the predicted range of percentage is less than the current range of percentage, for adjusting the number of customers in the subset of customers, the processor further executes computer-readable instructions for decreasing the number of customers in the subset of customers.

23. A system comprising:
  a memory storing computer-readable instructions thereon; and
  a processor that executes the computer-readable instructions to:
    receive first data from a group of customers intended to receive an update;
    identify a subset of customers from the group of customers based on the first data for receiving a canary version of the update;
    facilitate installation of the canary version of the update on each of the subset of customers;
    receive second data from each of the subset of customers upon installation of the canary version of the update;
    predict whether the subset of customers that receive the canary version is to increase or decrease based on the second data; and
    adjust a number of customers in the subset of customers for receiving the canary version of the update based on the prediction.

24. The system of claim 23, wherein the first data comprises at least one of a customer profile data, customer health data, software health data, support system data, or financial impact data for each of the group of customers.

25. The system of claim 23, wherein adjusting the number of customers in the subset of customers comprises increasing the number of customers that receive the canary version of the update.

26. The system of claim 23, wherein adjusting the number of customers in the subset of customers comprises decreasing the number of customers that receive the canary version of the update.

27. The system of claim 23, wherein the group of customers that are not in the subset of customers receive a stable version of the update.

28. The system of claim 23, wherein to identify the subset of customers for receiving the canary version of the update, the processor further executes computer-readable instructions to:
  compute a customer satisfaction score for a customer in the group of customers; and
  add the customer to the subset of customers upon determining that the customer satisfaction score of the customer is greater than or equal to a threshold score value.

29. The system of claim 28, wherein the customer satisfaction score is computed using a machine learning model trained using historical first data.

30. The system of claim 23, wherein to predict whether the subset of customers is to increase or decrease, the processor further executes computer-readable instructions to determine a predicted range of percentage of the group of customers to receive the canary version of the update.

31. The system of claim 30, wherein to adjust the number of customers in the subset of customers based on the prediction, the processor further executes computer-readable instructions to:
  determine a current range of percentage of the group of customers that are part of the subset of customers;
  compare the current range of percentage with the predicted range of percentage; and
  adjust the number of customers in the subset of customers based on the comparison.

32. The system of claim 31, wherein upon determining that the predicted range of percentage is greater than the current range of percentage, to adjust the number of customers in the subset of customers, the processor further executes computer-readable instructions to increase the number of customers in the subset of customers.

33. The system of claim 31, wherein upon determining that the predicted range of percentage is less than the current range of percentage, to adjust the number of customers in the subset of customers, the processor further executes computer-readable instructions to decrease the number of customers in the subset of customers.

* * * * *